US012761372B2

(12) United States Patent
Alles et al.

(10) Patent No.: US 12,761,372 B2
(45) Date of Patent: Oct. 13, 2026

(54) FAR-SOURCE POSITION DETERMINATION WITH METRICS AND DYNAMIC TRACKING

(71) Applicant: Parsons Corporation, Centreville, VA (US)

(72) Inventors: Martin C. Alles, Vienna, VA (US); John P. Carlson, Sterling, VA (US); Abdulwahaab Arif, Fairfax, VA (US); Sharif Shaher, Clifton, VA (US); Zachary Hester, Colorado Springs, CO (US); Ryan Riveland, Bismarck, ND (US)

(73) Assignee: Parsons Corporation, Charlotte, NC (US)

( * ) Notice: Subject to any disclaimer, the term of this patent is extended or adjusted under 35 U.S.C. 154(b) by 352 days.

(21) Appl. No.: 18/608,741

(22) Filed: Mar. 18, 2024

(65) Prior Publication Data

US 2024/0230917 A1 Jul. 11, 2024

Related U.S. Application Data

(63) Continuation-in-part of application No. 17/931,619, filed on Sep. 13, 2022, now Pat. No. 12,449,503.

(Continued)

(51) Int. Cl.
*G01S 19/25* (2010.01)
*G01S 19/27* (2010.01)

(52) U.S. Cl.
CPC ............ *G01S 19/256* (2013.01); *G01S 19/27* (2013.01)

(58) Field of Classification Search
CPC ...... G01S 19/256; G01S 19/27; G01S 19/071; G01S 19/073; G01S 19/28; G01S 19/41;

(Continued)

(56) References Cited

U.S. PATENT DOCUMENTS 5,177,489 A * 1/1993 Hatch ...................... G01S 19/11 342/450
6,564,064 B1 * 5/2003 Ciganer .................. G01S 19/46 455/11.1

(Continued)

FOREIGN PATENT DOCUMENTS

WO 0165271 A1 9/2001
WO 2012003411 A2 1/2012

OTHER PUBLICATIONS

Patent Cooperation Treaty, International Search Report and Written Opinion, International Application No. PCT/US2022/076388, date of mailing Jan. 3, 2023.

*Primary Examiner* — Bernarr E Gregory
(74) *Attorney, Agent, or Firm* — Martensen IP; Michael C. Martensen

(57) ABSTRACT

A method of dynamic position determination using a Kalman Filter to estimate a position of a moving aided node, including assigning a predicted value to each of twelve state variables for the aided node, weighting the accuracy of each prediction, determining a measurement for each state variable using a far source navigation algorithm, and then updating each state variable value using the measurement. A method for dynamic position determination that includes locating a moving aided node and one or multiple aiding nodes within a region of interest, and identifying one or multiple visible far sources. The aiding nodes and visible far sources are down selected using a set of metrics for evaluating the suitability of the aiding nodes and far sources, or pairs thereof, for use in developing a position of the aided node using a far source navigation algorithm.

14 Claims, 26 Drawing Sheets

Related U.S. Application Data

(60) Provisional application No. 63/244,404, filed on Sep. 15, 2021.

(58) Field of Classification Search
CPC . G01S 19/06; G01S 5/14; G01S 19/05; G01S 19/25; G01S 19/18; G01S 19/39; G01S 19/46; G01S 19/11
See application file for complete search history.

(56) References Cited

U.S. PATENT DOCUMENTS

| | | | | |
|---|---|---|---|---|
| 6,861,980 | B1 * | 3/2005 | Rowitch | G01S 19/05 342/357.31 |
| 6,950,058 | B1 * | 9/2005 | Davis | G01S 19/05 342/357.42 |
| 2002/0190896 | A1 * | 12/2002 | Tsujimoto | G01S 19/05 342/357.43 |
| 2003/0201932 | A1 * | 10/2003 | Rabinowitz | G01S 5/14 342/357.29 |
| 2004/0203915 | A1 * | 10/2004 | van Diggelen | G01S 19/05 342/357.42 |
| 2005/0062643 | A1 * | 3/2005 | Pande | G01S 19/25 342/357.64 |
| 2005/0068229 | A1 * | 3/2005 | Moilanen | G01S 19/06 342/357.42 |
| 2005/0159891 | A1 * | 7/2005 | Cohen | G01S 19/06 701/470 |
| 2005/0227709 | A1 * | 10/2005 | Chang | G01S 19/05 701/469 |
| 2006/0038719 | A1 * | 2/2006 | Pande | G01S 19/46 342/357.64 |
| 2006/0095206 | A1 * | 5/2006 | Garin | G01S 19/256 342/357.62 |
| 2006/0223549 | A1 * | 10/2006 | Chang | G01S 19/05 455/456.2 |
| 2007/0252758 | A1 * | 11/2007 | Loomis | G01S 19/256 342/464 |
| 2008/0048912 | A1 * | 2/2008 | Loomis | G01S 19/25 342/386 |
| 2008/0068262 | A1 * | 3/2008 | Loomis | G01S 19/39 342/357.22 |
| 2011/0275308 | A1 * | 11/2011 | Grobert | G01S 19/18 455/1 |
| 2014/0085142 | A1 * | 3/2014 | Baruch | G01S 19/25 342/357.64 |
| 2017/0269216 | A1 * | 9/2017 | Dai | G01S 19/05 |
| 2017/0299724 | A1 * | 10/2017 | Hsu | G01S 19/05 |
| 2020/0371193 | A1 | 11/2020 | Marshall et al. | |

* cited by examiner

FAR-SOURCE POSITION DETERMINATION WITH METRICS AND DYNAMIC TRACKING

RELATED APPLICATIONS

The present application relates to and claims the benefit of priority to U.S. Provisional Patent Application No. 63/244,404 filed 15 Sep. 2021, and is a Continuation-in-Part of U.S. patent application Ser. No. 17/931,619, filed Sep. 13, 2022, now U.S. Pat. No. 12,449,503, which each hereby are incorporated by reference in their entirety for all purposes as if fully set forth herein.

BACKGROUND OF THE INVENTION

Field of the Invention

Embodiments of the present invention relate, in general to position determination and more particularly to using imprecisely characterized distant signal sources to determine a position of a receiver.

Relevant Background

The modern era is exhibiting an explosion of activity with respect to space, and as a result multiple satellites systems are either now in orbit or will be in orbit within the next few years. In addition, a revolution in communications is taking place where devices are moving towards ubiquitous connectivity with low latency data transfer. From the perspective of a user requiring positioning or more generally navigation using satellite technology, this plethora of sources and ever enhancing data communications provides a rich resource. However, utilizing this resource is not straightforward, since the characterization of these signal sources is not publicly available, and is often protected.

The traditional method of using such sources in navigation, as for example in the Global Positioning System (GPS) or the like is to know, very precisely, where a signal source (satellite) is located at any given time, and in addition know, again very precisely, the timing of signals sent by such a source. In essence, an individual needs to know "where" the source is in space, and "when" a given signal is transmitted. GPS signals imbed in their transmissions to a GPS compatible receiver, the location of the satellite and the time of transmission. But lacking this information and a receiver to decode it, the signals are useless.

In addition, for navigation, one also needs to know or possesses the ability to estimate the imperfections on the signal that occur during the long traverse of the signal from a far source to the user (say for example on the earth in the case of a mobile receiver). These too need to be corrected prior to successfully using the measurements that can be made on the signal to feed a navigation algorithm.

In the GPS example, the user of the system determines the location of the source (in this case a GPS satellite) by reading the navigation data embedded in the signal. A read of the same data specifies the timing relationship on the GPS gold codes needed by the user to correlate and make a timing determination. Data in the navigation message is used to correct for deformities (delays due to channel imperfections, as for example, due to the ionosphere). It is at the end of this process that the user can then combine many such carefully made and corrected measurements from multiple satellites in an algorithm to determine user location.

When a Monitor Station (MS) at a known location is available, and able to assist the user (UE or Receiver (Rx)), the deformities on the signal can be minimized: the MS if in proximity to the Rx can determine these deformities and provide that information to the Rx.

Approaches taken by others previously, and utilizing a MS, use techniques associated with characterizing source signals visible to both the MS and User Equipment (UE or Rx) within a ROI (Region of Interest). The focus at the MS is, therefore, on characterizing the signals.

Preceding approaches utilizing a MS hinged on a general philosophy of:

- attempting to determine location or ephemeris information tied to some absolute time as precisely as possible,
- determining the transmission time sequence or frequencies of such signals as accurately as possible,
- determining deformities such as additional channel delays on the signal,
- passing this information via a communications channel (aiding channel) to the Rx,
- performing by the Rx measurements on the signal, combining this with other measurements of similar or different signals or devices, applying information regarding signal deformities gained from the MS, and thus
- determining its position.

Such methods are difficult to implement, and often are impossible to architect without multiple high fidelity MS units observing the signal source from geographically dispersed locations. For example, one can consider the GPS monitor stations placed worldwide which monitor the signals transmitted by GPS satellites, derive the needed information, pass the information to a control station, which then populates the information in the GPS navigation data which the GPS user is then able to read. Effectively, one can consider the GPS monitor stations as providing the same function a local MS attempts to provide in a more limited and localized context for some different signal usable for navigation.

What is needed is a simple yet effective system of positional determination that is neither dependent on the exact location of a signal source nor, the timing of a particular signal, nor deformities in the signal due to a variety of conditions. These and other deficiencies of the current positional determination system are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system and method are presented for navigation using a Monitor Station (MS) having a known location and signals impinging on both the MS and User Equipment (UE or Rx) where both entities can make measurements on common signals. A positional determination is achieved by an interpretation of measurements made on such distant sources even when lacking precise information as to the location of the sources or the exact transmission timing of the signals received.

The present invention uses signals from far sources without requiring precise ephemeris or signal timing information. These far sources can, for example, be any satellite, whether Highly Elliptical Orbit (HEO), Geosynchronous Orbit (GSO), Geostationary Orbit (GEO), Middle Earth Orbit (MEO) or Low Earth Orbit (LEO). For the present invention, LEO: Apogee altitude $h_A$<2000 km, GEO: Perigee altitude $h_P$>40164 km and apogee altitude $h_A$<44164 km, MEO: Perigee altitude $h_P$>2000 km and apogee altitude $h_A$<40164 km, GTO (Geostationary Transfer orbit): Perigee altitude $h_P$<2000 km and apogee altitude $h_A$>40164 km, HEO: all other objects.

The MS and Rx communicate, in one embodiment, on a low bandwidth data channel, exchanging measurement information with respect to common signals. The method described herein can be applied to establish the integrity of any other navigation, positioning, or timing application, such as for example GPS. The inventive technique detailed herein is hereafter referred to as Far Source Navigation (FSN).

In one version of the present invention, a method for far source positional determination includes measuring one or more time-difference of arrivals of one or more signals from one or more, respective, far sources. Each time-difference of arrival being between difference of arrival of each of the one or more signals at a first receiver and arrival of each of the one or more signals at a second receiver.

Next, the process includes, determining for each signal, a loci of points, forming one or more loci of points wherein each loci of points is at a distance from the second receiver (MS) on which the first receiver (Rx) resides based on the respective one or more time-difference of arrivals. Lastly the process ends by identifying a relative position of the first receiver from the second receiver based on an intersection of the one or more loci of points. As the location of the second is known, the position of the first receiver can be determined.

Other features of the claimed methodology include wherein a wavefront of each of the one or more signals are a planar wavefront. In addition, the location of the one or more far sources can be unknown as the location of one or more far sources is substantially irrelevant to identifying the relative position (via the unit vector) of the first receiver.

In another version of the present invention a first clock associated with the first receiver and a second clock associated with the second receiver are synchronized. And responsive to the first clock and the second clock having a relative bias, the process continues by identifying the relative position of the first receiver by examining a plurality of relative positions of the first receiver using a corresponding plurality of clock biases. Moreover, each of the corresponding plurality of clock biases can be applied to each measurement, thereby forming a convergence of solutions at the relative position of the first receiver.

Another feature of the invention is that a distance between the first receiver and the second receiver is viewed as a point with respect to the one or more far sources. Also, the content of the one or more signals is irrelevant apart from its structure to identifying the relative position of the first receiver.

A system for far source positional determination, according to one version of the present invention, includes a first and second receiver each configured to receive one or more signals from one or more far sources, respectively. The system also includes a time-difference module configured to measure one or more time-difference of arrivals, each time-difference of arrival being difference between arrival of one of the one or more signals at the first receiver and arrival of the one of the one or more signals at the second receiver. A loci of points module, configured to communicate with the—time-difference module and to determine, for each signal, a loci of points is another feature of the present invention. Each formed loci of points is at a distance from the second receiver on which the first receiver resides based on the respective one or more time-difference of arrivals. Lastly, the system includes a position module, using information gained from the loci of points module, configured to identify a relative position of the first receiver based on an intersection of the one or more loci of points.

The system of the present invention assumes that a wavefront of each of the one or more signals is a planar wavefront and is operable even though a precise location of the one or more far sources is unknown. Indeed, the exact location of one or more far sources is irrelevant to identifying the relative position of the first receiver.

The system also includes a first clock associated with the first receiver and a second clock associated with the second receiver, wherein the first clock and the second clock are synchronized. Responsive to the first clock and the second clock having a relative bias, the position module is configured to identify the relative position of the first receiver by examining a plurality of relative positions of the first receiver using a corresponding plurality of clock biases, and wherein each of the corresponding plurality of clock biases is applied to each measurement, thereby forming a convergence of solutions at the relative position of the first receiver.

One aspect of the present invention is that a distance between the first receiver and the second receiver, with respect to the one or more far sources, is a point and that the content of the one or more signals is irrelevant to identifying the relative position of the first receiver. In one instance of the present invention the second receiver location is known, and the position module is configured to determine a first receiver location based on the second receiver location.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings.

FIG. 4H shows the ideal performance in this case, when the measurement noise is zero.

Figure 1:
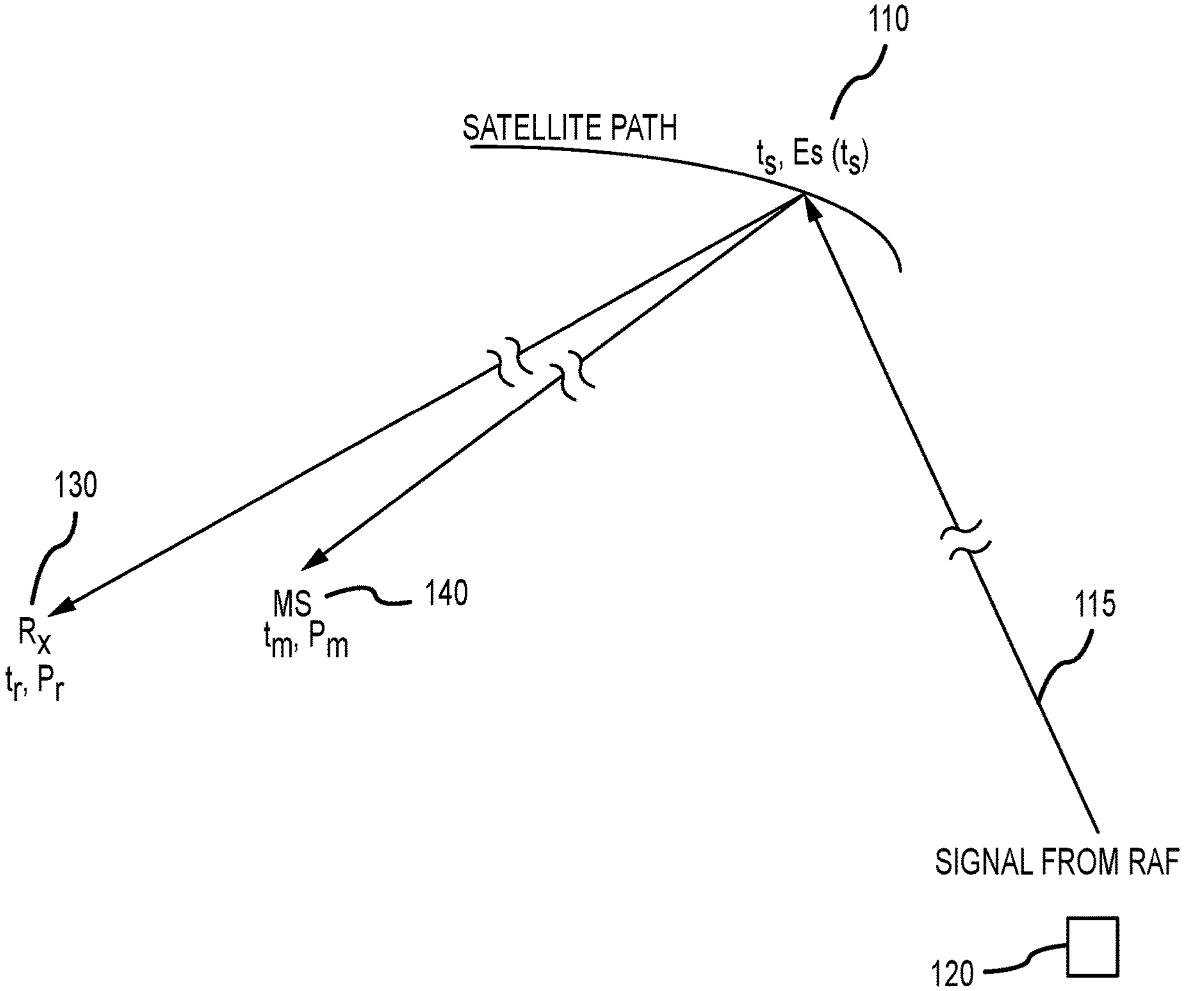
FIG. 1 depicts a general configuration of the far sources as applied to this disclosure, as well as a Rx and MS wherein the Rx and MS are positioned anywhere in space within a Region of Interest (ROI).

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

Two receivers located within a Region of Interest (ROI) that is sufficiently small as compared to a distance to a source of a signal (a far source) can be considered a "point". Signals received at that "point" are planar. Accordingly, any difference in the time of arrival of a signal from the source by one receiver as compared to another receiver located within that ROI establishes a locus of points representing a distance between the receivers perpendicular to the vector pointing to the source. Using signals from multiple far sources, multiple loci on which one receiver must exist as compared to the other receiver can be identified. The convergence of these loci identifies a relative position of one receive from the other, and if the geospatial position of other receiver is known, so too is the position of the one receiver.

The present invention can be visualized as a pole of fixed length pointing in one 3-D direction, combined with a mutual clock delay. Assume the directional pole to be associated with the clock delay, forming a representation of the space and time relationship between two nodes. These and other embodiments of the present invention are hereafter described in detail with reference to the accompanying Figures.

Although the invention is herein described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

By the term "ephemeris" is meant a tabular statement of the assigned places of a celestial body for regular intervals. A representation of an object's position and velocity over time, or coordinates derived from that, is called an "ephemeris". Historically, the term "ephemeris" referred to a printed table of position coordinates at discrete instants but is now extended to modern computational concepts like representations in time-continuous polynomial data-files. Imprecise ephemeris for satellites can quite easily be obtained from orbital prediction software that uses Two Line Elements (TLEs) as input. As an example of how such imprecise information provides generally useful data, consider a website such as N2YO: https://www.n2yo.com/At this website it is possible to observe the orbital paths of various satellites, computed using TLE information. TLE information is generated by the U.S. Space Surveillance Network, is publicly available for most space sources, and permits the computation of satellite ephemeris. The precision with which ephemeris can be obtained by such a process can result in errors of many km. Errors of that magnitude generally preclude utilization of the ephemeris for navigation in any traditional method of navigation, since that error will be reflected in user location error.

The terminology used herein is for the purpose of describing embodiments only and is not intended to be limiting of the invention. As used herein, the singular forms “a,” “an” and “the” are intended to include the plural forms as well, unless the context clearly indicates otherwise. Thus, for example, reference to “a component surface” includes reference to one or more of such surfaces.

As used herein any reference to “one embodiment” or “an embodiment” means that a particular element, feature, structure, or characteristic described in connection with the embodiment is included in at least one embodiment. The appearances of the phrase “in one embodiment” in various places in the specification are not necessarily all referring to the same embodiment.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being “on,” “attached” to, “connected” to, “coupled” with, “contacting”, “mounted” etc., another element, it can be directly on, attached to, connected to, coupled with, or contacting the other element or intervening elements may also be present. In contrast, when an element is referred to as being, for example, “directly on,” “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under,” “below,” “lower,” “over,” “upper” and the like, may be used herein for ease of description to describe one element or feature’s relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as “under”, or “beneath” other elements or features would then be oriented “over” the other elements or features. Thus, the exemplary term “under” can encompass both an orientation of “over” and “under”. The device may be otherwise oriented (rotated 90 degrees or at other orientations) and the spatially relative descriptors used herein interpreted accordingly. Similarly, the terms “upwardly,” “downwardly,” “vertical,” “horizontal” and the like are used herein for the purpose of explanation only unless specifically indicated otherwise.

FIG. 1 provides a high-level depiction of a signal generated by a far source and received by two different entities, Rx and MS. In the example shown in FIG. 1, a satellite 110 in orbit around the earth receives a signal 115 from a Radio Access Facility (RAF), 120 also described as a gateway, that is relayed to ground stations Rx 130 and MS 140. In the instance shown in FIG. 1, the signal 115 emanates from the RAF 120 at to arriving at the satellite 110 at $t_s$. At $t_s$·the signal is retransmitted to the receivers, Rx 130 and MS 140 arriving at $t_r$ and $t_m$, respectively. $t_r$ and $t_m$ and not equal. That is, the time of arrival of the signal at Rx and MS is different.

The present invention focuses on the differential measurements between the arrival of the planar signal at Rx and the MS. Many of the specifics of where exactly the signal originated, what time it originated, what delays or deformations the channel or satellite performed on the signal in its long transit from a far source or from the RAF can be ignored. The present invention analyzes the differential of arrival to two locations from one or more far sources.

A far source is defined, for the purpose of this discussion, as a source with a distance from a Region of Interest (ROI) in which receivers (Rx and MS) reside, where the transmit antenna is located on the order of thousands of km distant from the receiving antenna. Given several such sources, including those that are in motion, a location for the Rx can be determined in closed form. Alternatively, the system can combine the measurements on the far sources (with the method detailed here) with other available measurements to generate a location estimate, and thus, sequentially navigate.

Sources that are not far, can also be addressed by this system and method with a slight penalty in achievable accuracy. However, for far sources, where their position, ephemeris or orbit may be known quite imprecisely (many km error), and where the timing of such signals is also imprecise and not necessarily periodic, the present invention can determine a high accuracy location for a receiver in closed form. Note that most satellites can in fact be treated as far sources given a reasonably sized ROI.

Imprecise timing is also not a concern since the present invention uses differential measurement of the arrival of a signal at MS and Rx. What is meant by imprecise timing is that far sources are all transmitting signals that are in use by some receiver system, most often communicating data and sometimes voice. Thus, over relatively short period of time, these signal sources produce stable waveforms: the waveforms hew to their design. The present invention simply requires a stable waveform so that both the MS and Rx can perform an arrival time measurement on some segment of the waveform. The invention does not need to know the precise time at which the waveform may have been transmitted from the source, or the entire content of the waveform.

Referencing again FIG. 1, consider the general signal pathway for a typical satellite. As an example, let us consider a Geostationary Earth Orbit (GEO) satellite 110. A signal 115 in this case generally emanates from a ground-based gateway indicated in FIG. 1 as a Radio Access Facility (RAF) 120 at some time to, arrives at the satellite at time $t_s$ and the transponded signals arrive at a Monitoring Station, (MS) 140, and at the Receiver, (Rx) 130, at times $t_m$ and $t_R$ respectively. The position of the MS is known perfectly and is represented by $P_m$. The Rx is at some unknown position $P_R$. The satellite ephemeris at the time of signal emission (from the satellite) is $E_s(t_s)$. For the purposes of this disclosure, the signal could also originate at the satellite (as for example how it does in GPS), and in fact it is the final leg of the signal travel, from the apparent source (for example the satellite) that is pertinent in the present invention.

FIG. 1 is deceptive as to the scale of separation of Rx and MS with respect to distance to the transmitting far source. Assume in this instance that Rx 130 is distant at most from the MS 140 by on the order of 10 km. However, the satellite 110 is distant 40,000 km (or more) from either the Rx 130 or the MS 140. The region of interest in which Rx and MS exist is therefore essentially a point if drawn to scale. This is fundamental to the present invention.

Figure 2A:
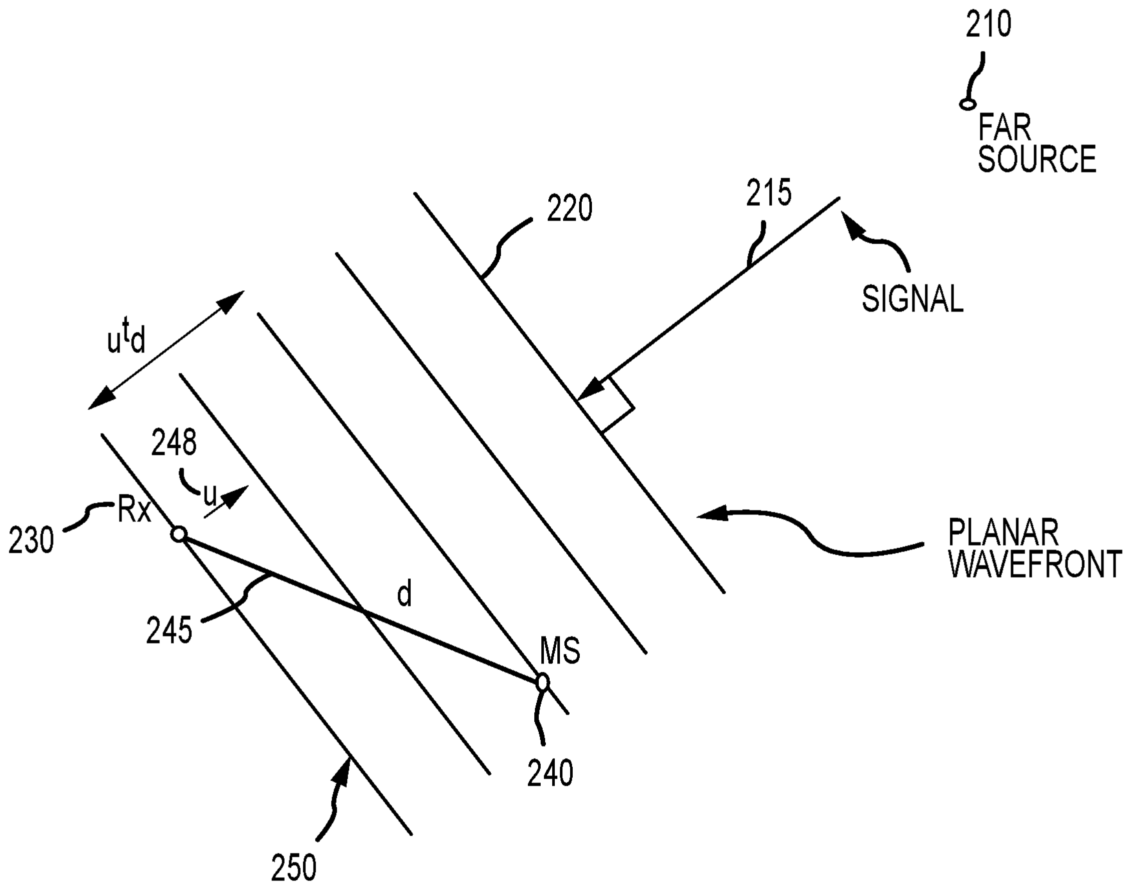
FIGS. 2A-2C depict planar wavefronts representing a signal from a far source according to one embodiment of the present invention along with the relationship of the measurements to the vector distance between the MS and Rx and the common unit vector pointing in the direction of the far source.

FIG. 2A illustrates the reception of a far source signal 215 in the vicinity of a MS 240 and Rx 230 in a typical Concept of Operations (ConOps). The fundamental observation of FIG. 2 is that the wavefront 220 of the transmitted signal 215 from the far source 210 is planar. The wavefront is substantially a perfect plane given the massive distance at which the far sources considered are located and for the purposes of this invention the wavefront is assumed to be perfectly planar. It is nearly certainly a plane in the small region of interest that encloses both the MS and the Rx. Thus, if the distance from the Rx 230 to the MS 240 is a vector d 245, and u 248 represents a unit vector pointing towards the far source 210 (from either the MS or the Rx), then the difference in time of arrival of the signal measured at the Rx 230 and the MS 240 is exactly $(u^t d/c)$ where d is the vector pointing from the Rx to the MS and c is the speed of light. The vectors here are taken to be column vectors, and the unit vector is transposed by the superscript, denoted as t, in this operation.

Another way to interpret this is to say that if $\delta t$ is the time difference of arrival between the signal arrival time at the MS and at Rx, then the Rx 230 must be located somewhere on a plane perpendicular to u and where this plane 250 is at a distance $c\delta t$ from the MS. Note that Rx may be anywhere on the plane.

This observation is a powerful tool in developing the location algorithm. Consider that the unit vector can also be thought of as a Line of Bearing (LOB) in three dimensions. Unit vector approximation error quantification is discussed later in this disclosure.

Figure 2B:
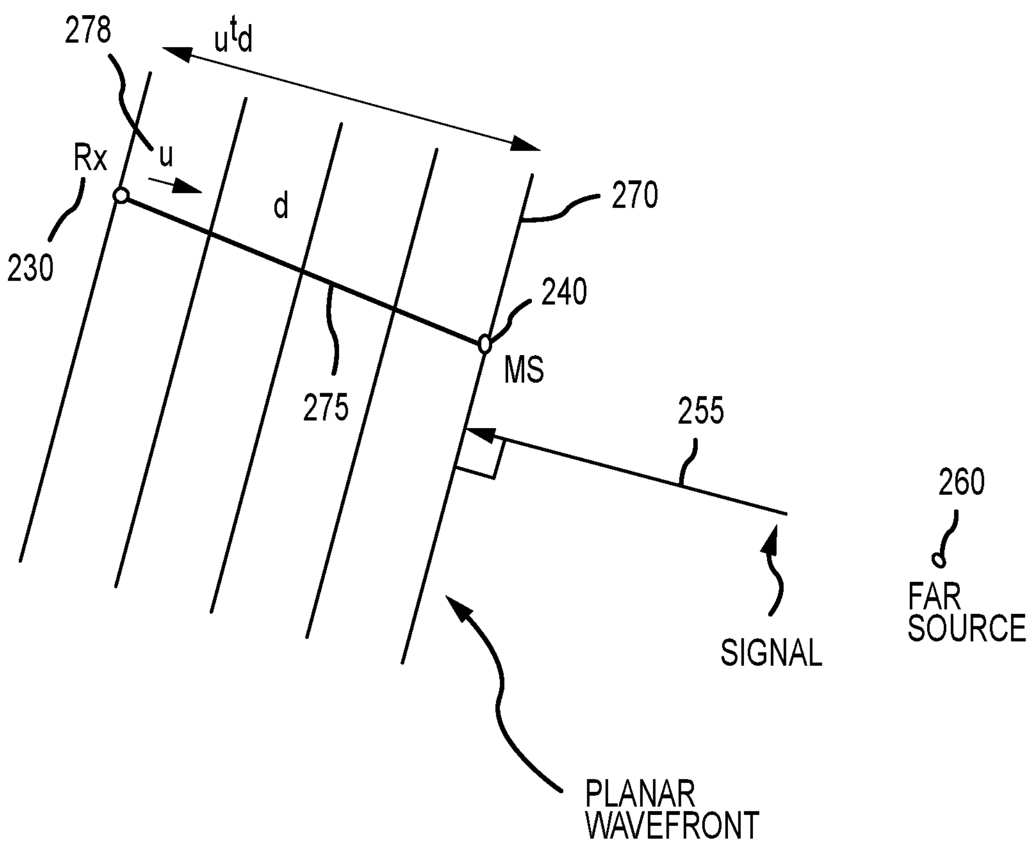

FIG. 2B illustrates the reception of another far source signal in the vicinity of MS 240 and Rx 230. The wavefront 270 is again planar. Note the planar wavefront 220 of the far source 210 in FIG. 2A differs from the planar wavefront 270 in FIG. 2B. As with FIG. 2A, the distance from the Rx 230 to the MS 240 is a vector d 275, and u 278 represents a unit vector pointing towards this new far source 260 (from either the MS or the Rx), and the difference in time of arrival of the signal measured at Rx 230 and MS 240 is exactly $(u^t d/c)$ where d is the vector pointing from the Rx to the MS and c is the speed of light.

Consider that if both the MS 240 and Rx 230 can observe three such far sources, and if the Rx 230 has an accurate clock, and if the far sources are spread out geometrically, the location of the Rx 230 is at the intersection of three distinct planes, namely a point. And if the Rx 230 and MS 240 can observe four such geometrically spaced far sources, and the Rx clock drifts, the Rx can still be located, this time at the intersection of three surfaces, each of which is formed from the differences of four surfaces. This can also be visualized as constructing an ensemble of planes, all of which are parallel shifts of four distinct planes, and where the shifts represent the candidate clock bias. Note that there is only one clock bias that is unknown. In general, four distinct planes will not intersect in a point, but when shifted in the indicated manner, a point is identified, and that solution then provides both the Rx position and the clock bias.

Figure 2C:
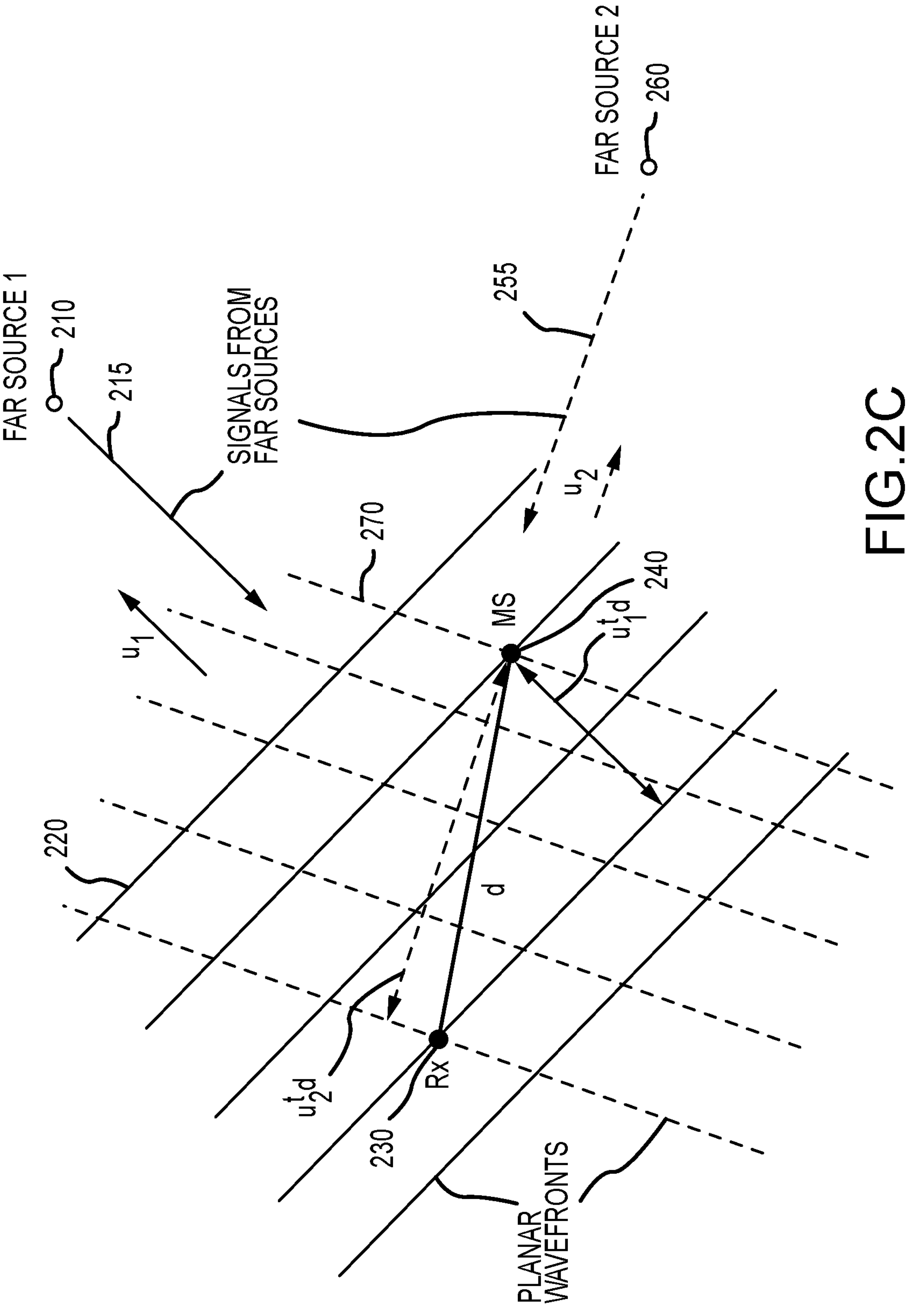

FIG. 2C presents a two-dimensional depiction of the reception of signals from two far sources 210, 260 by Rx 230 and MS 240. Based on each difference in time $\delta t$ at which the signals were received, Rx 230 exists on a plane perpendicular to u for each far source where this plane is at a distance $c\delta t$ from the MS. These planes intersect forming a line extending through the paper on which Rx 230 exists. Assuming Rx resides on the surface of the earth, (in this case the surface of the paper on which the drawing exists) the location of Rx can be determined to be the intersection of the three planes.

Recall a fundamental assumption of the present invention is that the unit vector used to derive the measurements that feed Far Source Navigation (FSN) has certain properties. The main assumed property of the unit vector is that within the Region of Interest (ROI), the unit vector to the far source is effectively identical, no matter where one is in the ROI. As the distance to the far source increases the applicable area of the ROI increases.

The error on FSN measurements that results from this assumption can be bounded and indeed this error is quite small, and much smaller than the errors that can emerge from alternative GPS denied navigation schemes. For example, assume a ROI with radius 15 km as an initial target area to determine this type of error.

Figure 3:
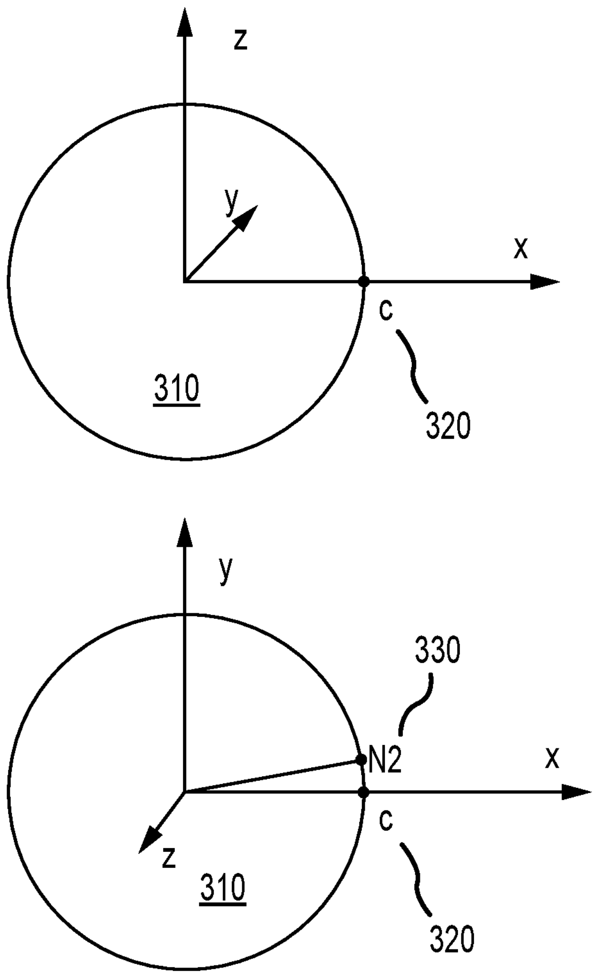
FIG. 3 represents the earth having a MS and a Rx positioned along the Y axis and a far source visible by both MS and Rx, according to one embodiment of the present invention.

With reference to FIG. 3, in general, the ROI for this analysis, given the distance to the far source (not shown), can be anywhere on the surface of the earth 310, and the far source can be anywhere in space with an elevation above some minimum elevation (assume 3 degrees) above the centroid C of the region to ensure reception. To represent this in 3-D, it is sufficient to place C 320 as shown in FIG. 3 on the surface of the earth 310. The circles denote the earth with axes representation as shown. In the upper circle the Y axis is into the paper, whereas in the lower circle the earth is rotated such that the Z axis is now out of the paper. Assume the Monitor Station (MS) is located at C 320 which is a known location. Node 2 330 (N2 or Rx) is at a position along the Y-axis distant from point C 320 but also on the surface of the earth. Node 2 330 can have its distance from C 320 randomized uniformly within the region radius, i.e., uniformly selected within 0-15 km for this example. Given that a far source is a certain elevation, then all geometries of C, N2, and the far source are equivalent to our selection, or mathematically considered homomorphic.

The far source, in this example, can be represented using spherical coordinates [r, θ, ϕ] being the radius, azimuth and elevation of the far source with respect to center of the earth. The azimuth θ can be viewed as a rotation in the [YZ] plane about the [X] axis, and the elevation as the angle subtended at the center of the earth by the far source above the plane [YZ]. One way to think about the location of the far source is to consider a plane parallel to the ZY axis through the point C, and that the far source is anywhere to the right of that plane, limited only such that its elevation with respect to C is at least some minimum angle $\beta_{min}$. If the far source is located at some point in space F, (represented by the exact vector F), the ideal time measurements made at C (node 1) and node 2 can be computed as can the unit vector and measurement error.

The ideal time difference (converted to distance) at the two nodes can be expressed as:

$$\delta_T = \|F - N1\| - \|F - N2\|,$$

this being the time difference on a given signal burst from the far source measured at the nodes. Given the far source ephemeris, and considering its error, the unit vector from node 1 to the far source is computed as:

$$\underline{u_1} = \frac{F + E - N1}{\|F + E - N1\|},$$

where E is the ephemeris error (the error in FSN system knowledge of the far source location).

The FSN measurement can now be written as:

$$\delta_T = \underline{u_1}'\underline{d},$$

where the vector d is the vector from node 2 (N2) to node 1 (N1). Again, note N1 is shown as C in FIG. 3. This equation includes error associated with the unit vector approximation (planar wavefront approximation) that can be bound or quantified.

The error due to using the unit vector determined at N1 throughout the ROI can be expressed as:

$$\delta_T = \underline{u_1}'\underline{d},$$

and this can be now plotted for various randomizations of the far source location F, and the node 2 position N2.

And since a positional determination using FSN of the present invention (or a combination of one or more FSN measurements with other sources) produces a location estimate generally well within 100 meters of the true location, the unit vector approximation can be improved by using a repeated or iterated solution once a first solution has been determined. Consider computing a new representative unit vector (specific to locating node 2) by using the mid-point between the node 1 and the node 2 estimate. This strategy dramatically reduces the FSN unit vector error, in some cases to a fraction of a meter. One can think of this as the "best" approximation to the unit vector that balances the two nodes.

As demonstrated in the previous section, the MS can be used in Rx positioning, by what is essentially a method of differential positioning. The argument being that the difference in TOAs (Times of Arrival) on the same burst, as observed by the MS and the Rx is directly related to the vector projection of the relative position vector ($P_m - P_R$) in the direction of the satellite from the operational area of interest.

The result is of a form given by the position vector of the MS to which is added a differential vector. The latter differential vector is fully defined by the unit vectors and the measurement differences. The matrix U is non-singular as previously presented, and constant, so the measurement differences drive the location solution: as they change the estimate changes.

Moreover, the measurements needed to locate any given node (say Node 1) do not all need to be associated with two nodes (the node being located and the already located node). In fact, a set of nodes that have location can provide the needed measurements. For each such node, and each far source, this produces an equation needed in the location of Node 1. Here several nodes that assist Node 1 by performing measurements against different far sources. Thus, for example Node 3 could be obtaining measurements on the signals transmitted by a given far source while Node 2 could be doing the same for a different far source. The network then transfers the data needed to Node 1. For each such node outside the region in this example, Node 1, when it also processes against the same set of far sources, obtains one measurement. With each such pairing of nodes, Node 1 is placed on a plane a specific distance away from the associated other node. Intelligence in the network can decide on the best allocation of far sources to nodes so as to provide Node 1 with the data needed for location. The modifications to handle clock bias follow exactly as described previously.

Another aspect of the present invention is the combining of far source measurements with other sources. Observing the form of the basic FSN equation applicable to a single far source as:

$$m_1 = u_1^t (r_m - r) + \delta,$$

where $m_1$ is the measured time difference between the Rx and MS, $u_1$ is the unit vector from the ROI to the far source, $r_m$ is the position vector of the MS, r the position vector of the Rx, and δ the clock bias of the Rx, note immediately that it would be trivial to incorporate such measurements into any such filter. The unit vector is essentially fixed, the MS location is fixed, and the clock error is in linear form. Thus, including any number of these measurements into an Extended Kalman Filter (EKF) along with any previously established measurements is straightforward. Adding even one such FSN measurement to an existing system already using other measurements could be a key to a position solution.

Figure 4A:
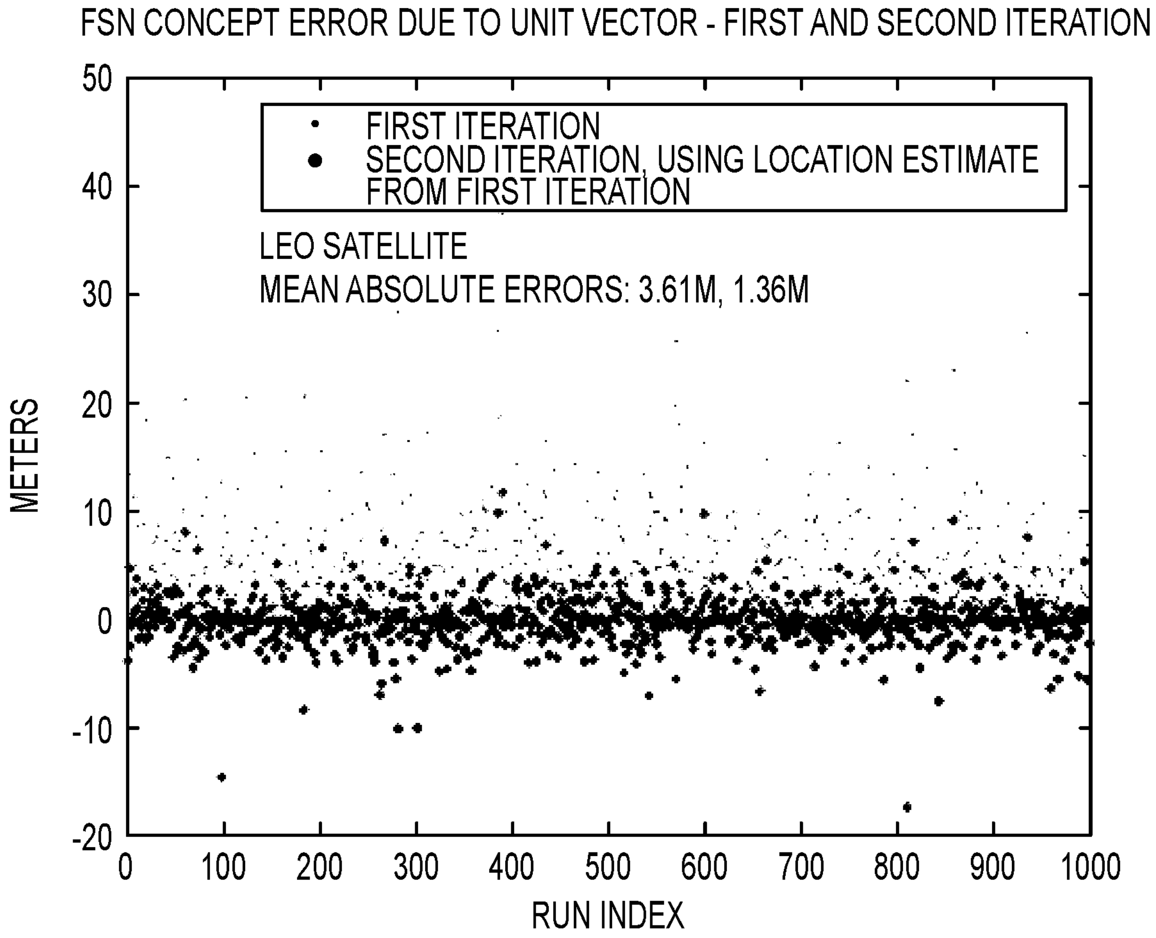
FIGS. 4A-4E depict plots of error due to unit vector approximations due to an initial estimate and improved estimations/refinements according to one embodiment of the present invention.
Figure 4B:
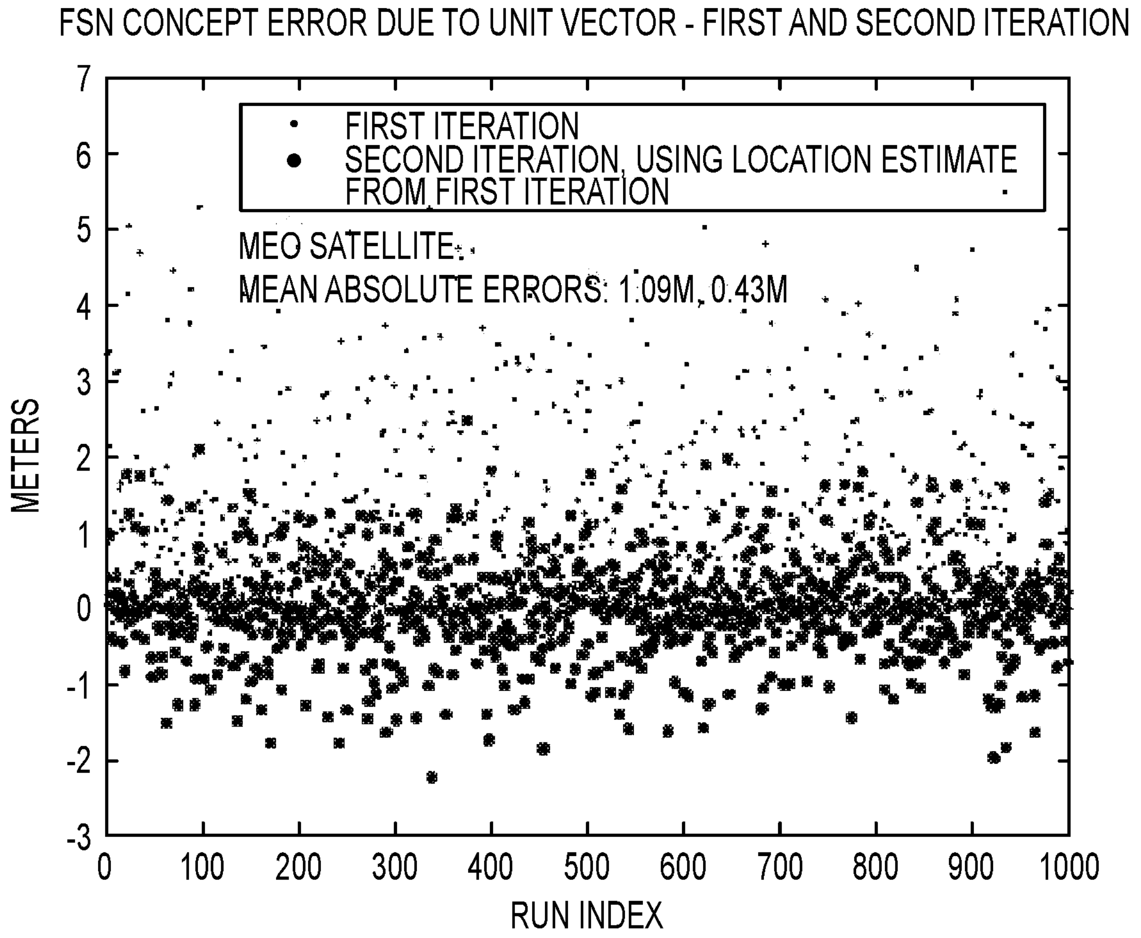
Figure 4C:
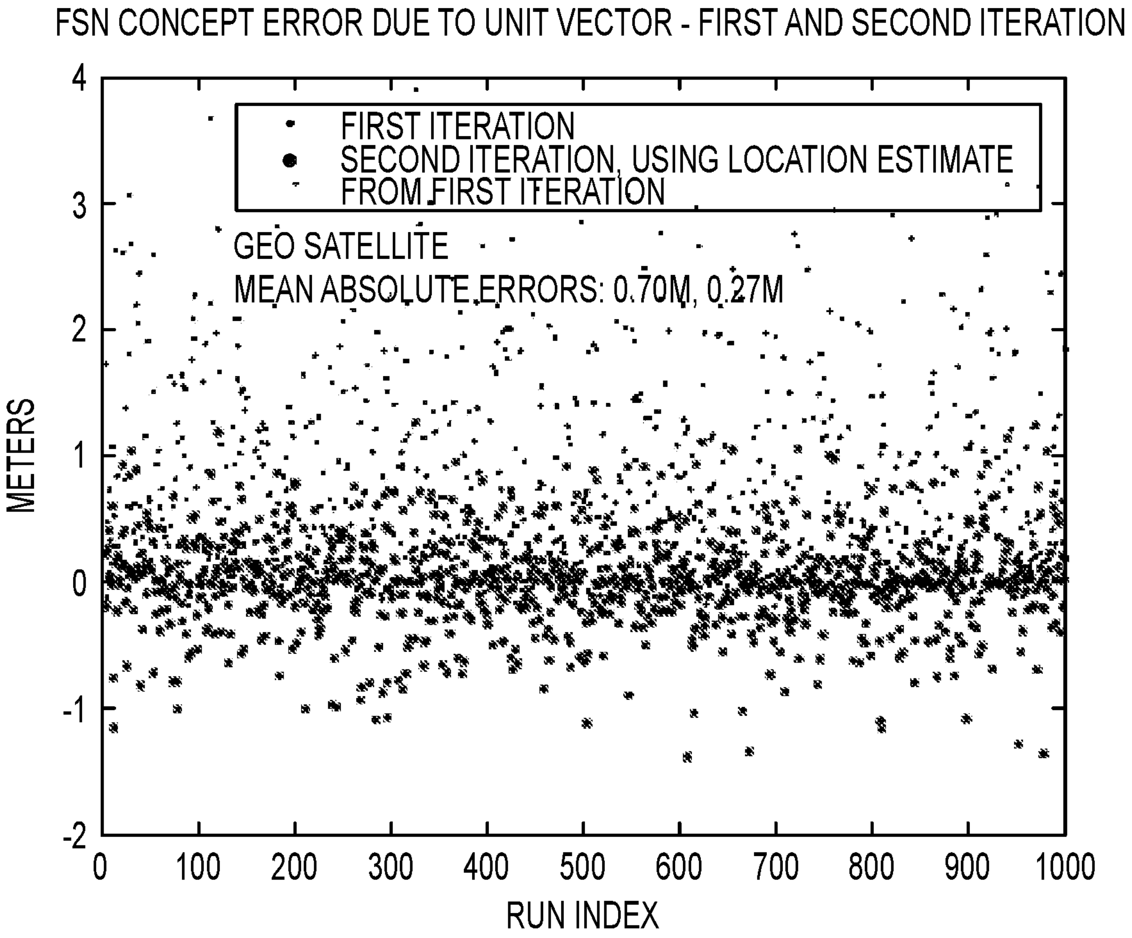
Figure 4D:
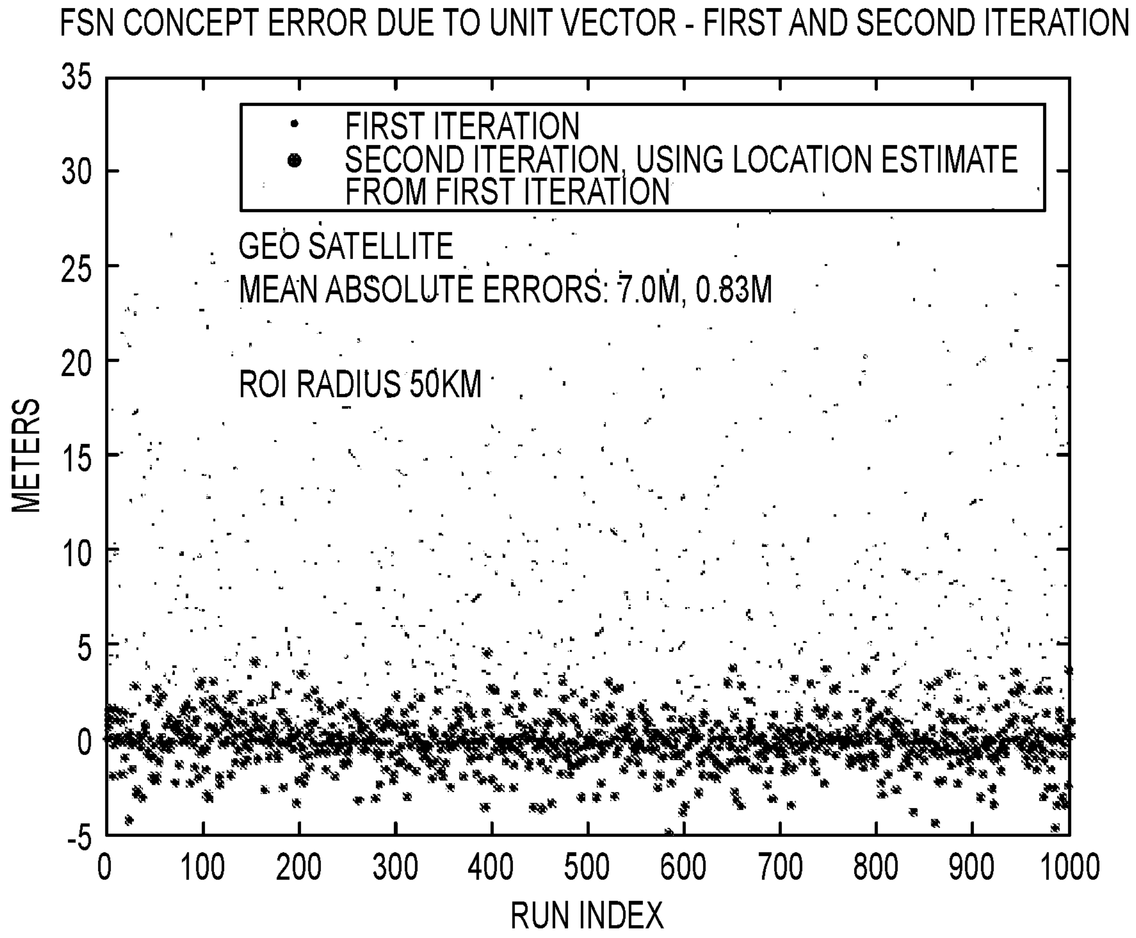
Figure 4E:
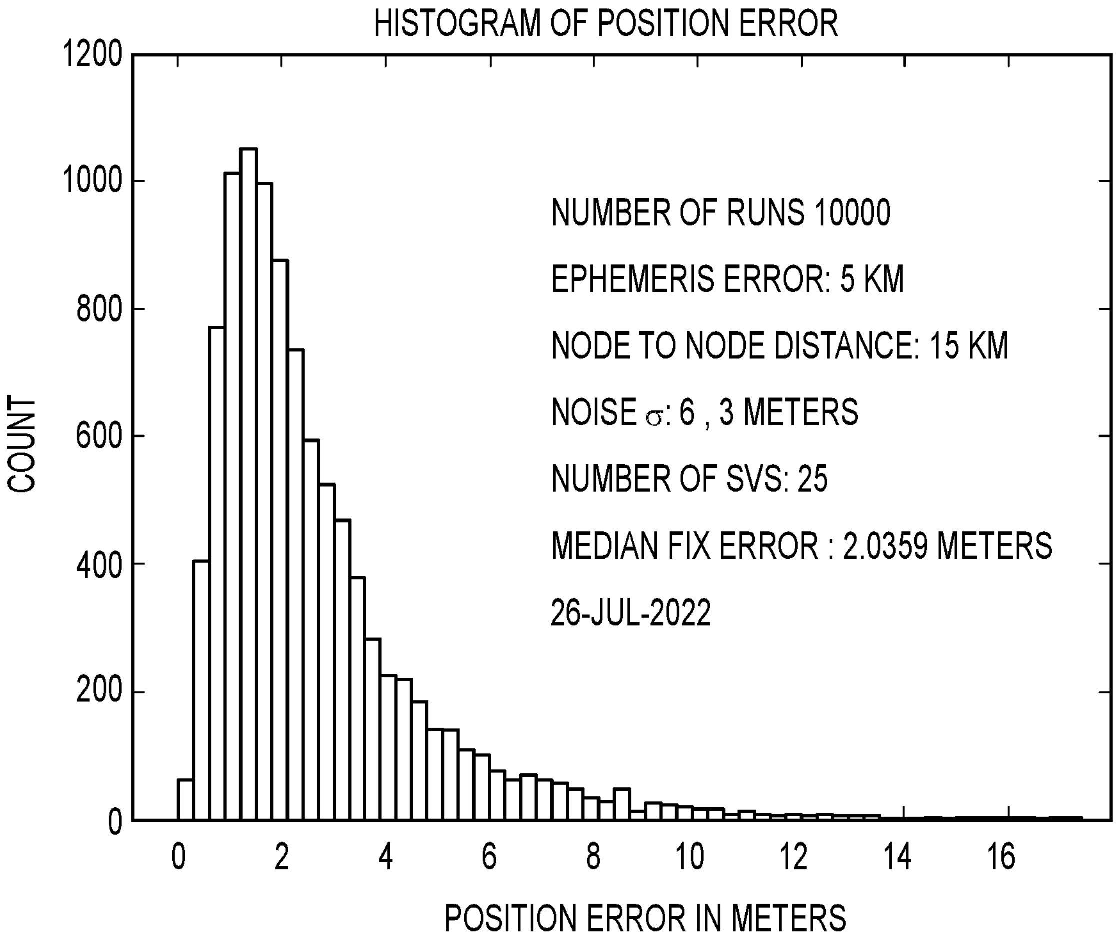
Figure 4F:
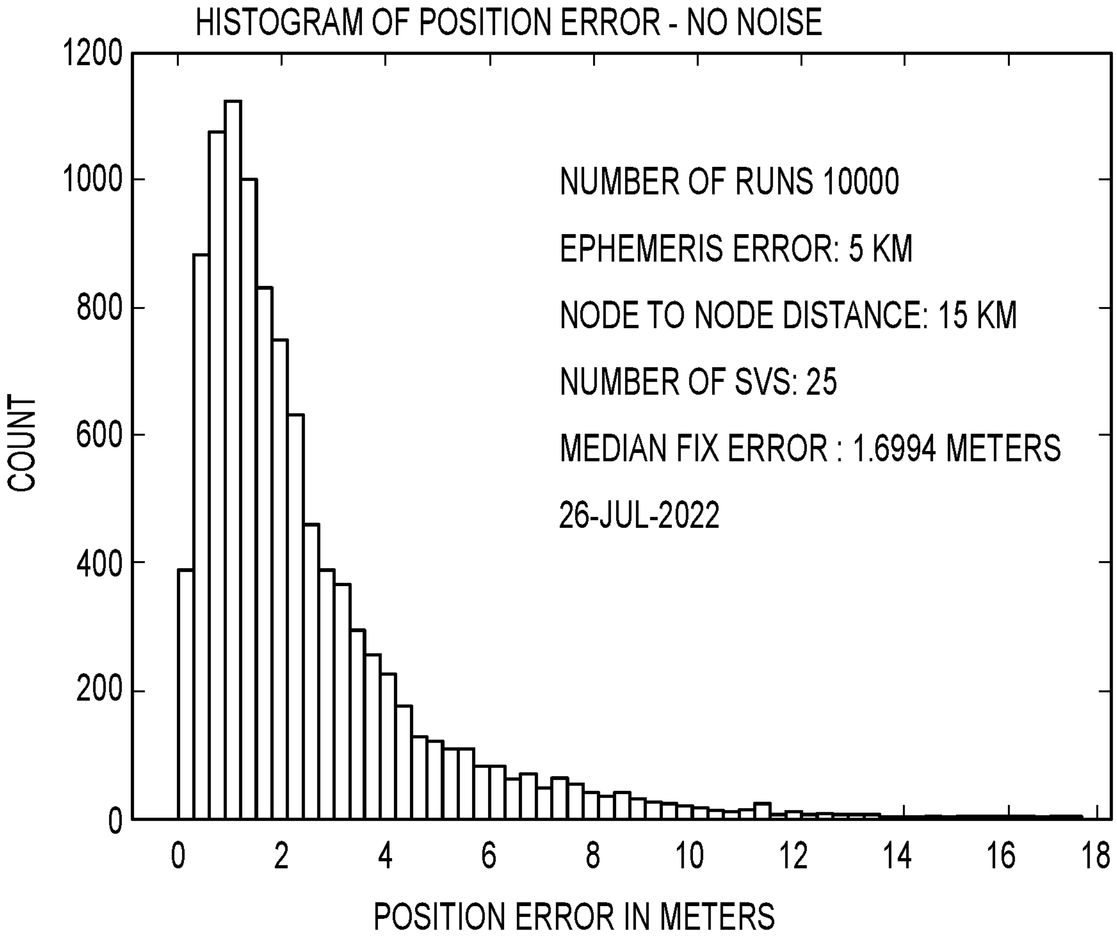
FIGS. 4F-4H show the achievable location accuracy performance of a mix of far sources in a simulation where the measurement noise at node 2 is 3 m, and the measurement noise at node 1 is 6 m.

FIGS. 4A-4C show plots of the error due to the unit vector approximation, firstly due to the initial estimate of the vector, and secondly with the improved estimate discussed above after the initial location estimate. Plots for LEO, MEO and GEO satellites show that it is clear how the error varies with distance to the far source. As indicated earlier the satellite geometry is fully randomized in space with respect to the ROI where node 1 and node 2 lie.

Figure 4G:
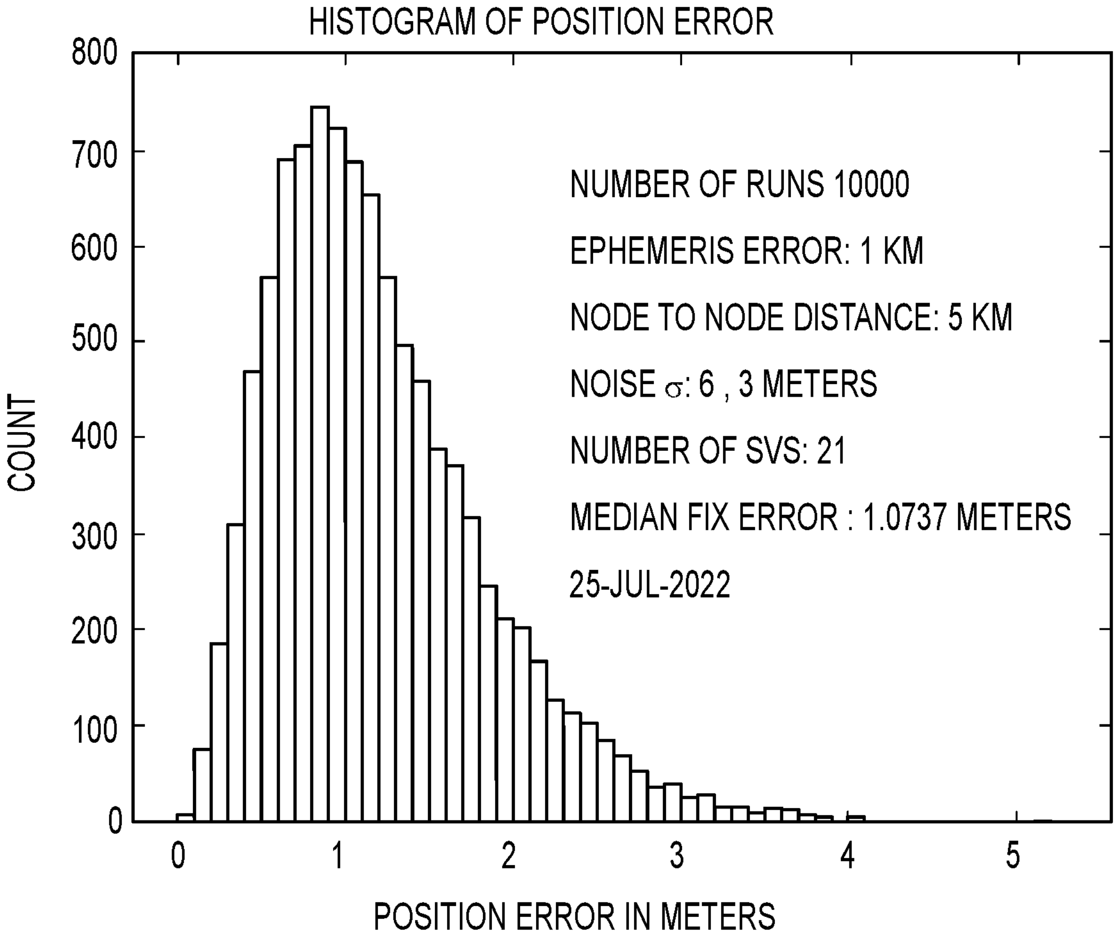
Figure 4H:
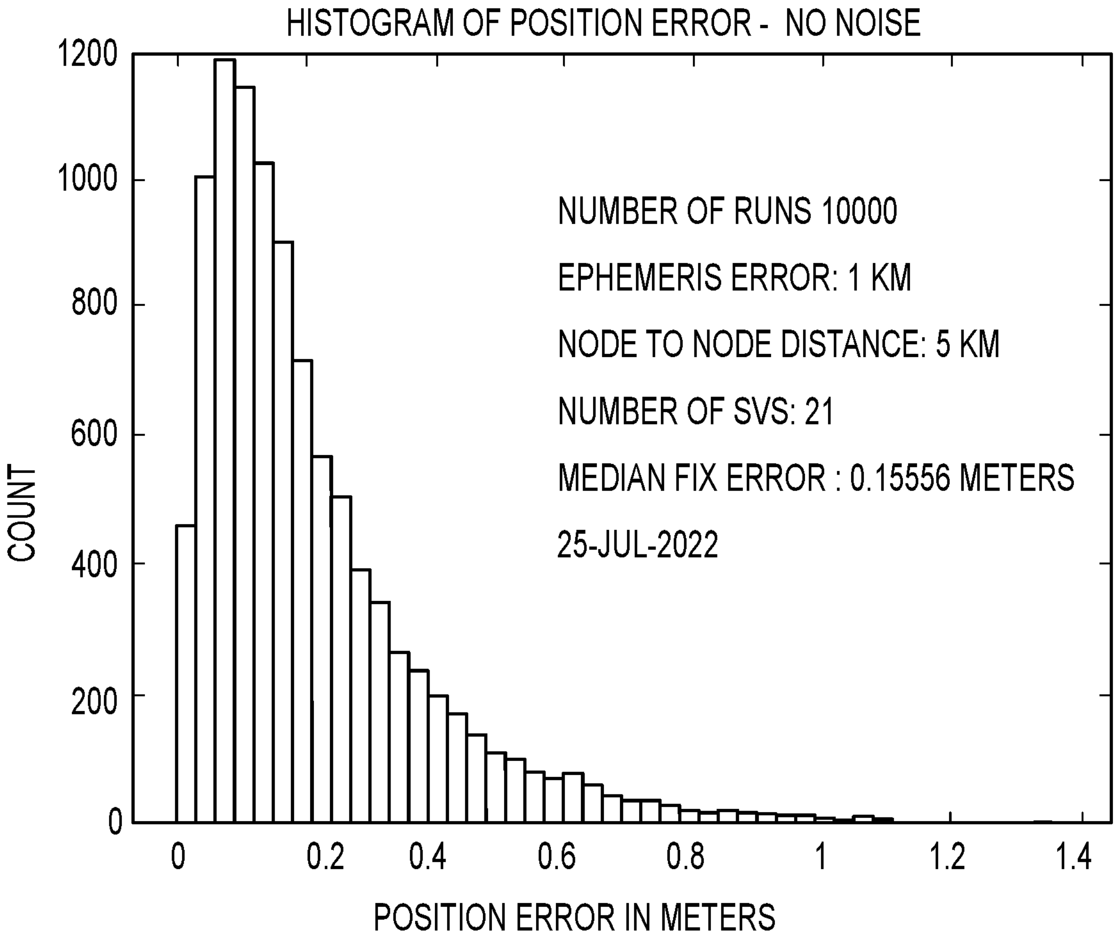

FIG. 4G shows the achievable location accuracy performance of a mix of far sources including LEOs, MEOs and GEOs in a simulation where the measurement noise at node 2 is 3 m, and the measurement noise at node 1 is 6 m. FIG.

4H shows the ideal performance in this case, when the measurement noise is set to zero.

It is noted that this geometrical error due to the unit vector approximation radically decreases in the second iteration as shown in FIGS. 4A-4C. In addition, a general observation can be made that this error is the only significant error with FSN when noise is excluded. Contrast that with standard satellite navigation where the errors derived from (1) ephemeris, (2) signal timing, (3) and the very long channel. These errors are often in the tens of meters to even hundreds of meters (for example with MUOS satellites). The present invention shows that the unit vector approximation of the present invention can be considered negligible for typical TLE level ephemeris errors with a ROIs of radius15 km. Note that standard satellite navigation is far more sensitive to ephemeris error (the location error is then of the same order) since it uses the range to the satellite.

It is of interest to consider what happens when the ephemeris error decreases. As the ephemeris error goes to zero, the geometrical error due to the unit vector approximation goes to zero in the second iteration. In other words, using the mid-point between node 1 and the estimated location of node 2 to construct the unit vector removes all the geometrical error. Of course, FSN is developed as a technique to provide accurate Position, Navigation, and Timing (PNT) even with substantial ephemeris error (many km errors). However, if there are one or two satellites which can generate ephemeris with reduced error (better than the original TLE level error), there is then an immediate payoff in reduction of the geometric error.

In an illustrative case of a GEO far source using a ROI of radius 50 km, unit vector approximation errors are again small. For example, this means that a node 2 in the vicinity of Washington DC could be located using a set of such sources (even including MEOs) with low error using a node 1 in Annapolis. In fact, if it was known that node 2 was in fact somewhere in metro DC, one could proceed directly to the second iteration solution, since the unit vector construction could use the mid-point between DC and Annapolis (rough coordinates for each are more than sufficient.)

Note that since there are over 500 GEOs and over 150 MEOs in operation today, these satellites are often ideal "far sources" for utilization of FSN as described herein. They provide the least geometrical error, in addition to making the smallest signal processing demands at the FSN nodes due to the reduced motion dynamics of such sources.

Note that as the ROI increases in size, one may have to consider small variations of the differential channels to the nodes, which may contribute a few meters of error in the worst case. An example of such differential behavior is the horizontal gradient of the Total Electron Content (TEC) of the ionosphere which, if high, would mean as much as a 1-meter maximal additional time differential between nodes over a very large ROI diameter (e.g., 50 km). Such adjustments and refinements can be easily addressed just as they may be in the case of standard satellite navigation.

Figure 5A:
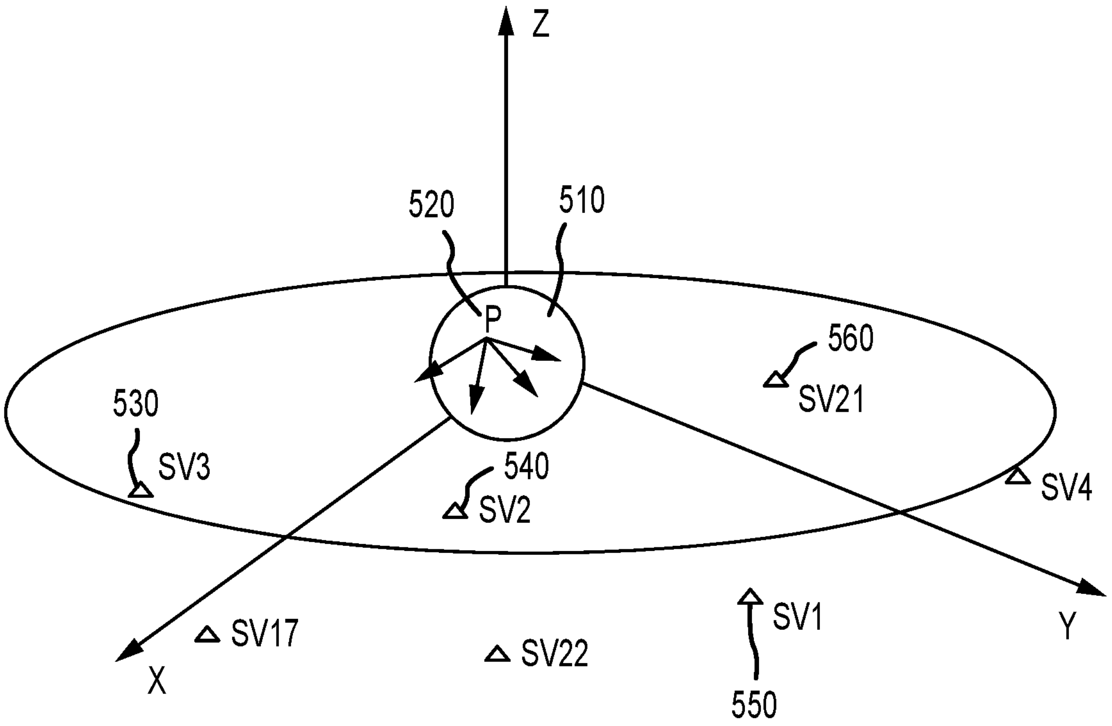
FIG. 5A presents a scenario where several Geosynchronous Earth Orbiting (GEO) satellites are used in a Far Source Navigation context with the unit vectors displayed providing an intuitive understanding of the present invention.

FIG. 5A provides a perspective view of a plurality of far source satellites orbiting the earth 510 as applied to identify a position of a receiver P 520, according to one embodiment of the present invention. Assume, for this example, that Rx and MS can receive signals from four far sources Satellite Vehicle 3 ("SV3") 530, SV2 540, SV1 550, SV21 560. Rx and MS are in communication with each other, and the location of MS is known. Also assume that the clock on Rx drifts. Both are located within a region of interest depicted in FIG. 5A as point P 520.

As demonstrated in the previous section, the MS can be used in Rx positioning, by a method of differential positioning. The argument being that the difference in TOAs (Times of Arrival) on the same signal burst, as observed by the MS and the Rx is directly related to the vector projection of the relative position vector ($P_m - P_R$) in the direction of the satellite from the operational area of interest.

Thus, with reference to FIG. 1 in view of FIG. 5A, $$t_R - t_m = \left(\frac{1}{c}\right)[P_m - P_R] \xrightarrow{\Delta} [E_S(t_S)],$$

where the operator indicates projection in that direction, assuming the Rx has an accurate clock. This equation then defines a surface of position constraining the locus of Rx. When Rx does not have a well-disciplined clock, then multiple such measurements to different satellites can be used in a differential context to define such surfaces.

This example focuses on the case where the Rx clock drifts slowly such that it can perform correlations to signals adequately but develops bias (interpreted here as an excess over the correct value) over time. This bias is represented as a clock error & (in units of distance) that can be considered constant over some short period of time in which multiple measurements are performed.

Assume four far sources (shown in FIG. 5A) to which the unit vectors from the region of interest P are $u_1$, $u_2$, $u_3$, $u_4$. Each such unit vector has a notation of 3×1. For visualization, it is helpful to think of the region of interest (the region in which the ConOps executes) as a point P, which it is in relation to the massive scale of the distance to each far source. Thus, any variation in this unit vector as a function of motion within the region of interest can be shown to be changes in fractional magnitude of the order of $10^{-4}$, in other words very small. This is equally true considering both locations of interest (Rx, MS) reside in the region of interest and any ephemeris errors are the same magnitude. Thus, error induced at both ends of the signal path are considered.

It is also observed that if the far source does move considerably over the duration of a ConOp, there is no difficulty for the MS to also pass a slowly varying unit vector characterization of the far sources to the Rx. This movement of the far source can be useful in reducing positioning errors.

Let $m = c(t_R - t_m)$ denote the measurement associated with a given far source. Then the time difference on reception of a signal from the far source at the Rx with reference to the MS is:

$$c(t_R - t_m) = m = -u^t(r - r_m) + \delta.$$

Now considering each source separately:

$$m_1 = -u_1^t(r - r_m) + \delta,$$

$$m_2 = -u_2^t(r - r_m) + \delta,$$

$$m_3 = -u_3^t(r - r_m) + \delta,$$

$$m_4 = -u_4^t(r - r_m) + \delta.$$

The fact that the measurements are inherently noisy is addressed after establishing the solution.

Differencing the equations with respect to the first equation yields:

$$m_1 - m_2 = -(u_1^t - u_2^t)(r - r_m),$$

$$m_1 - m_3 = -(u_1^t - u_3^t)(r - r_m),$$

$$m_1 - m_4 = -(u_1^t - u_4^t)(r - r_m).$$

It is obvious to one of reasonable skill in the relevant art that the LHS (Left Hand Side) consists of scalars whereas the RHS (Right Hand Side) constitutes vectors and vector transposes. r is the (3×1) vector (unknown) representing the location of Rx whereas $r_m$ is the known (3×1) vector representing the MS. The objective is to solve for r.

Concatenating the LHS terms vertically into a vector (note that they are scalars), yields the matrix equation:

$$\begin{bmatrix} m_1 - m_2 \\ m_1 - m_3 \\ m_1 - m_4 \end{bmatrix} = \begin{bmatrix} u_1^t - u_2^t \\ u_1^t - u_3^t \\ u_1^t - u_4^t \end{bmatrix} [r_m - r],$$

Let $$U = \begin{bmatrix} u_1^t - u_2^t \\ u_1^t - u_3^t \\ u_1^t - u_4^t \end{bmatrix},$$

and then immediately, $$r = r_m - U^{-1} \begin{bmatrix} m_1 - m_2 \\ m_1 - m_3 \\ m_1 - m_4 \end{bmatrix},$$

so that the unknown location of the Rx is solved. Now, given r one can solve for the clock bias δ by substituting into any of the original equations involving r, δ. Critical to a solution is that U is not singular, which should easily hold if the far sources are spatially well separated.

The equations above have solved for the Rx location in closed form. This solution is due to the planar wavefront, so that all expressions could be expressed exactly and in linear fashion. More typically, in dealing with Least Squared (LS) fixers or Extended Kalman Filters (EKFs) a Jacobian matrix is needed to express partial differentials that linearize about some estimate which then allows one to develop a better estimate.

With a solution achieved, the issue of noise on the measurements is revisited. Examining the final result for r, and noting the measurements appearing on the RHS, a first solution is directly obtained with the measurements as they appear. If multiple measurements are available while the Rx has not appreciably moved within the time interval of these measurements, a solution can average the set of solutions over a short time span. This effectively filters out the noise. More typically, and examining the form of the result, the measurement noises with or without dynamic Rx motion can be averaged out by the use of filters such as Kalman Filters.

An alternate derivation avoids differencing of measurements and can be more stable to execute. Considering each source separately one can write:

$$m_1 = -u_1^t(r - r_m) + \delta,$$

-continued $$m_2 = -u_2^t(r - r_m) + \delta,$$

$$m_3 = -u_3^t(r - r_m) + \delta,$$

$$m_4 = -u_4^t(r - r_m) + \delta.$$

This can be written in matrix forms as:

$$\begin{bmatrix} m_1 \\ m_2 \\ m_3 \\ m_4 \end{bmatrix} = \begin{bmatrix} u_1^t & 1 \\ u_2^t & 1 \\ u_3^t & 1 \\ u_4^t & 1 \end{bmatrix} \begin{bmatrix} r_m - r \\ \delta \end{bmatrix},$$

where the first matrix on the RHS is (4×4) and the second (4×1).

Now define the matrix V by $$V = \begin{bmatrix} u_1^t & 1 \\ u_2^t & 1 \\ u_3^t & 1 \\ u_4^t & 1 \end{bmatrix}.$$

Then $$\begin{bmatrix} r_m - r \\ \delta \end{bmatrix} = V^{-1} \begin{bmatrix} m_1 \\ m_2 \\ m_3 \\ m_4 \end{bmatrix}$$

so that one can solve for both the position vector of Rx and the clock delay simultaneously. Either technique provides a method to calculate the position and clock, though the latter may be preferred since it is more direct.

Note that when there is an abundance of measurements, beyond four, methods such as least squares positioning can be easily applied. To consider this, assume there are N sources so that now the measurement vector is (Nx1), and the matrix V is (Nx4). The solution is then:

$$\begin{bmatrix} r_m - r \\ \delta \end{bmatrix} = (V^t V)^{-1} V^t \begin{bmatrix} m_1 \\ m_2 \\ m_3 \\ \cdot \\ \cdot \\ m_N \end{bmatrix}.$$

Observing the form of the basic equation defining a single far source as:

$$m_1 = u_1^t(r_m - r) + \delta,$$

one can note immediately that it would be trivial to incorporate such measurements into any navigation filter. The unit vector is known, the MS location is known, and the clock error is in linear form. Thus, including any number of these measurements into an EKF along with any previously established measurements should be straightforward. Adding even one such FSN measurement to an existing system making other measurements could be key to an accurate position solution.

FSN can also be used to time synchronize nodes. Consider any two such nodes, and assume they have clock time errors given by $\delta_1$ and $\delta_2$ respectively. the nodes will produce some receive time estimates:

$$r_1 = [\, t_{1,1} + \delta_1 \quad t_{1,2} + \delta_1 \quad t_{1,3} + \delta_1 \quad t_{1,4} + \delta_1 \,],$$

$$r_2 = [\, t_{2,1} + \delta_2 \quad t_{2,2} + \delta_2 \quad t_{2,3} + \delta_2 \quad t_{2,4} + \delta_2 \,]$$

The first vector is then off true time by $\delta_1$ and the second by $\delta_2$. Note that these errors will be very slowly varying functions of time for typical receiver clocks.

When the nodes happen to be within 15 km of each other, and assuming the SV signals result in decent correlation results, first note that any pair $t_{\{1,j\}}$, $t_{\{2,j\}}$ can differ at most by 50 microseconds (the distance divided by the speed of light). This is the worst case bound on receive time for two nodes separated 15 km for each other and occurs only when the signal is directly traveling on the line through one node to the other. In most case of interest this time difference will be much less than 50 microseconds for far sources that are overhead.

Given that the true time of each is off by some unknown number, form the difference vectors on each, as:

$$d_1 = [\, t_{1,1} - t_{1,2} \quad t_{1,1} - t_{1,3} \quad t_{1,1} - t_{1,4} \,],$$

$$d_2 = [\, t_{2,1} - t_{2,2} \quad t_{2,1} - t_{2,3} \quad t_{2,1} - t_{2,4} \,],$$

These time difference vectors now have no clock bias terms; the biases disappear due to the subtraction.

Note that given the mutual distance assumption (<15 km), then when these burst observation vectors are a correct pairing, $N=\|d_1-d_2\|$ must be in the order of tens of microseconds, since these measurements have no clock bias components. Exact measurements polluted only by noise can only be so much off from each other if the observing nodes are not very far apart.

Consider the case where 4-vectors of receive time measurements from node 1 at node 2 are obtained sequentially. The task for node 2 is to decide which such vector is time aligned to its own measurements. Recognize that the periodicity observations of the SV signals differ among the SVs. For example, it should be possible to pick a replica for a particular beam such that a correlation is viable only once every 240 ms, a GPS Gold code-like signal may be once every 1 ms (or if you look for correlation sign changes, once every 20 ms) etc. Thus, in general all these time measurement vectors would show dynamic dissimilarity. As a result, N will be large for the wrong alignment, and within a few tens of microseconds or at worst 50 microseconds for the correct alignment. If a wrong pairing is made, successive pairings should exhibit the error (a false pairing is not sustained over time).

Another way to say this is that when an observation vector (a vector of differenced arrival times from a set of sources) from one node is paired with the wrong observation vector from another node, then it is extremely unlikely that the computed difference norm N is small. This can be easily seen by constructing some examples. In addition, a wrong pairing (effectively resulting in setting the clock of the second node to the first), is unsustainable as new observation vectors come in (they will diverge significantly). By viewing all the timing measurements obtained at each node as a long vector, sorted in time ascending order, then the problem after differencing as explained previously, reduces to aligning the long vectors by shifting one long vector against the other long vector until the condition of small N is achieved. This is a more intuitive way to visualize the operation of alignment.

Hence, the methodology of the present invention can:

(a) determine the proper burst association for two nodes, even if the node clocks are significantly relatively biased. This burst association is needed for the proper function of FSN.

(b) determine the closeness of nodes; lacking the ability to satisfy the distance requirement of roughly N<50 microseconds or some equally small number for any pairing, means that the node likely belongs in a different set (different node grouping), or different AMS, or outside the region of interest, (c) apply FSN to solve for the relative time bias down to the tens of nanosecond regime, synchronizing the FSN node network down to the equivalent of a few meters or a few tens of meters in the worst case.

FSN may be used to synchronize time in a network of nodes where the node positions are known. Solving for time or clock bias is inherent to FSN solving for position and time, but if position is already known, then time alone can be solved for with potentially higher accuracy, and hence nodes can be synchronized.

Figure 5B:
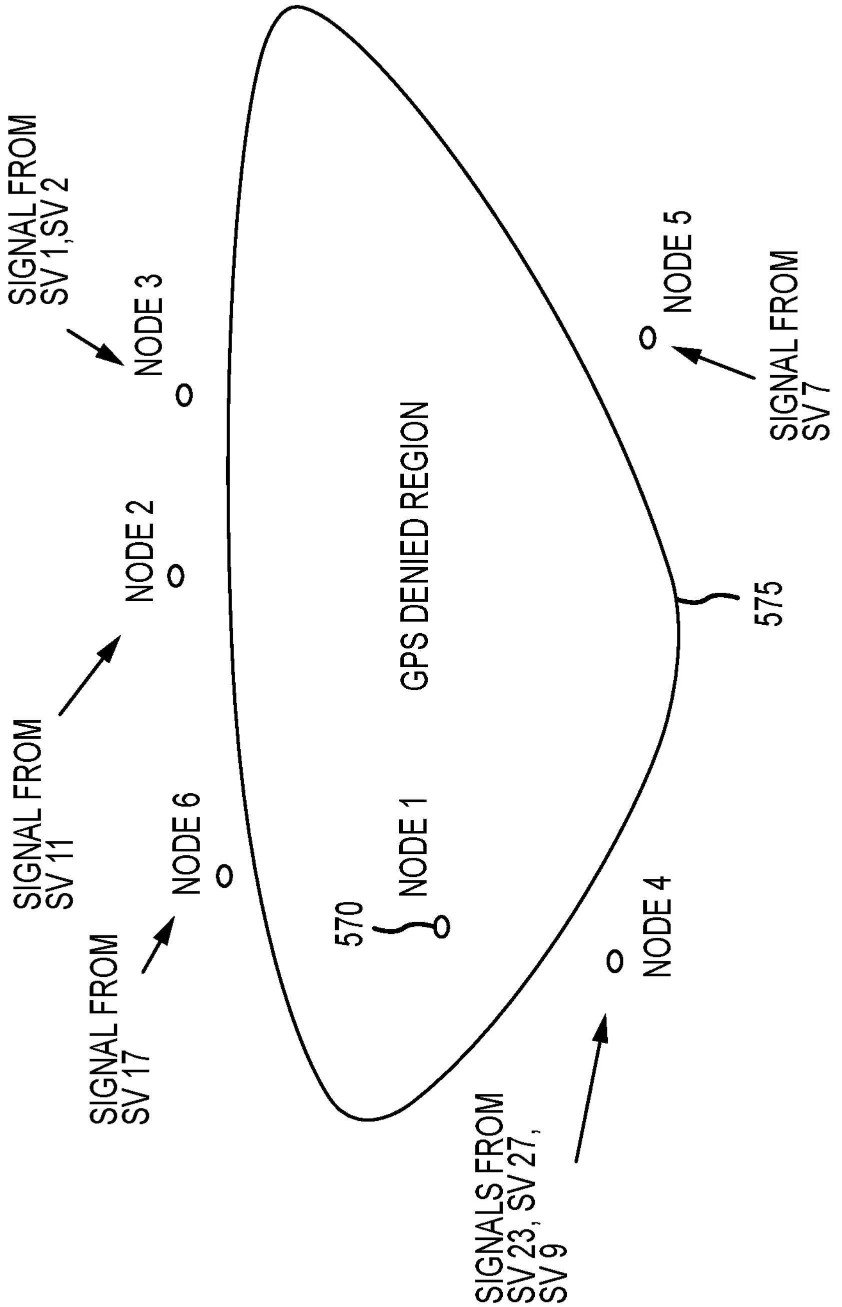
FIG. 5B provides a high-level view of a GPS denied region (note that GPS denied can be taken to mean GNSS denied, or more generally where the expected navigation signals are denied for one reason or another) and use of Far Source Navigation according to one embodiment of the present invention to determine a position of a node using GPS locations of one or more other nodes.

As previously discussed, the position of a receiver, or node, can be located with measurements (the vector distance from receiver to a master station) from three far sources in which node 1 has a synchronized clock with a master station (or node 2 in this example). And even if the clock is not synchronized the location of node 1 can be determined with measurements from four far sources. One aspect of the present invention is that the measurements do not need to come from a single master station or node. The measurements can come from other nodes that have position knowledge. For example, consider the scenario shown in FIG. 5B. Node 1 570 in FIG. 5 B is in a GPS denied zone 575. Yet several nodes surrounding node 1 570 are aware of their position via various GPS resources, shown here as Satellite Vehicle (SV ##). Assume that Node 1 570 is in communication with each of nodes 2, 3, 4, 5 and 6. Further assume that nodes 2, 3, 4, 5 and 6 each possess their GPS location. Therefore, for each far source and for each node, N, the present invention can determine a measurement of how far node 1570 is from node N. Again, the loci of points are perpendicular to the unit vector to a given source.

Each Node N measurement coupled with Node 1 570 measurement on a given far source, provides one such loci of points (planes) of positioning. Accordingly, where all these planes intersect is the position solution for Node 1. These candidate positioning planes can derive from measurements from a collection of GPS un-denied nodes, rather than a single node. If Node 1 has a clock bias, the solution proceeds as previously described for handling clock bias, but now with all nodes N providing the needed measurements.

According to another embodiment of the present invention, it is possible to make a significant improvement to location accuracy once a first estimate of the location has been generated. As can be seen in the earlier plot of location error, for a ROI of diameter 15 km, the errors are at most 35 m. This error is largest when the nodes of interest are separated by the maximum distance (or in the context of a MS, when the receiver to be located is 15 km distant from the MS).

Upon invocation of the location algorithm as described earlier, a foundational assumption was to use the unit vector generated at the MS and apply that to the receiver as well. In other words, given the approximate ephemeris available at one node (in this case at the MS) the node calculates the unit vector and passes this information to the receiver so the receiver can apply that value of the unit vector in the location algorithm.

Given that the resulting location has an error that is upper bounded by about 50 m (in general), note that the error is much less than the distance between the nodes in this worst case (15 km). Once a first location estimate is obtained, the mid-point of the line joining the first node to the (now located) second node is taken, and that mid-point is used to compute a new unit vector, which is now used in a repeated application of the algorithm, error is bounded. This process generates a unit vector whose error (projection error) is significantly less than the original unit vector. Each aiding node should implement this refinement of the applicable unit vector. This dramatically improves the estimated location of the present invention.

This dramatic improvement is most noticeable for far sources that are closer to the earth such as LEO satellites. While the improvement is still applicable to GEOs, the improvement with GEOs is smaller since the original error is also much smaller.

Another way to understand this of the present invention is to consider the second iteration of the algorithm performed using the reconstructed unit vector as a technique to counter the slight non-planarity of the signal wavefront when viewed over the extremes of the ROI. By taking two nodes separated maximally within the ROI, their separate unit vectors computed to the same ephemeris will show a minute difference. This difference is minimized when the unit vector used is generated from the mid-point of the two nodes. This approximate mid-point can be generated from the first run of the algorithm. The repeated algorithm run then dramatically reduces the errors, sometimes down to a fraction of a meter.

The present invention, described herein, presents a method and system for the use of far source signals for navigation. By noting that the far source generates a planar wavefront in the vicinity of a region of interest containing both a MS and an Rx whose location is to be determined, the solution can be expressed in closed form.

The accuracy of the method is primarily governed by the noise on the measurements. The term “far” is inter-related to the size of the ConOp region, the distance to the signal source and the imprecision of the source location. When the distance is large enough, the same systems developed here can be applied. The larger the distance however the more imprecision in the source signal location and the larger the ConOp region that can be included within the system.

An analogous characteristic exists for traditional line of bearing (LOB) estimation of signals. In LOB problems, the angle of arrival of a signal using precisely known positions of receiving antennas, very closely spaced on the order of a fraction of the wavelength of the signal, is the desired solution. In the present invention, the goal is to solve for the relative position of one of the multiple antennas (Rx antenna in relation to the MS antenna) given a known angle of arrival (interpreted in 3 dimensions, as a unit vector). However, the arrival angle is not perfectly known, but it is known well enough due to the very distant source location. The analogy is not perfect but may be helpful to understand the physics or provide intuition. In one case, LOB, the carrier signal phase is the focus of examination while in the present invention the focus rests on the Time of Arrival (TOA) of a signal.

Many variations of this basic idea can be considered and are within the scope of the present invention. Approximate methods like this can be applied for sources that are not as far. Measurements different from time of arrival can be considered: for example, the Doppler difference between a stationary MS and a moving Rx would be entirely due to Rx motion. Applications to signals such as distant digital TV (DTV) towers can be viable since angular differences would still be quite small over a very small ROI.

The far source can be either near stationary (relative to the earth), such as a GEO satellite, or at the other extreme move rapidly as in the case of a LEO satellite. Approximate ephemeris for such far sources is easily obtained and hence FSN is applicable in each case. In each case, and depending on the set of far sources selected, as well as the desired navigation accuracy, the size of the ROI can be determined.

To better understand the present invention, consider the geometry and its impact on the solution. If the far sources are restricted to near equatorial GEO satellites (and specifically geosynchronous rather than geostationary satellites), the optimum regions for location would be mid-latitude regions on the earth surface, assuming no other sources come into the mix. Mid-latitude regions would provide the best 3-D distribution of the unit vectors. Nearer to the equator, the solution while it can be very good in the East-West axis, may have more problems in the North-South axis. Similarly, as one approaches the poles, the visibility of equatorial source, however distant from the earth diminishes, so these regions may be difficult for the exploitation of the system. However, if one expands the far sources to include other medium far sources or nearer far sources with dynamic motion, the FSN of the present invention performs quite well. For example, if one was to combine GEO satellites with LEO satellites (for example, at an inclination 52 degrees) a much better and dynamic geometry would be created since the sources are not near equatorially concentrated.

Returning to FIG. 5A, one skilled in the relevant art can observe a far source signal geometry (not to exact scale) as seen at a mid-latitude position P on the earth. Note the need for two geosynchronous sources which thereby generate diversity in the Z dimension. The arrows emanating from P show the unit vectors of interest to the system and method of this document. A configuration identical to this has been simulated by the authors with good results. In addition, a configuration with three such geosynchronous sources and one LEO source has also been simulated; the LEO source provides improved sensitivity in the Z axis.

Another approach to increase the sensitivity in the Z axis and to enable exclusive use of near equatorial sources, according to one embodiment of the present invention, is to add more geosynchronous sources. Given that there are more than 150 such satellites operating today and given that one can observe a third of them from most earth locations not close to the poles, when the number of observed such far sources is increased beyond four, a dramatic improvement in Z axis sensitivity results.

Figure 6:
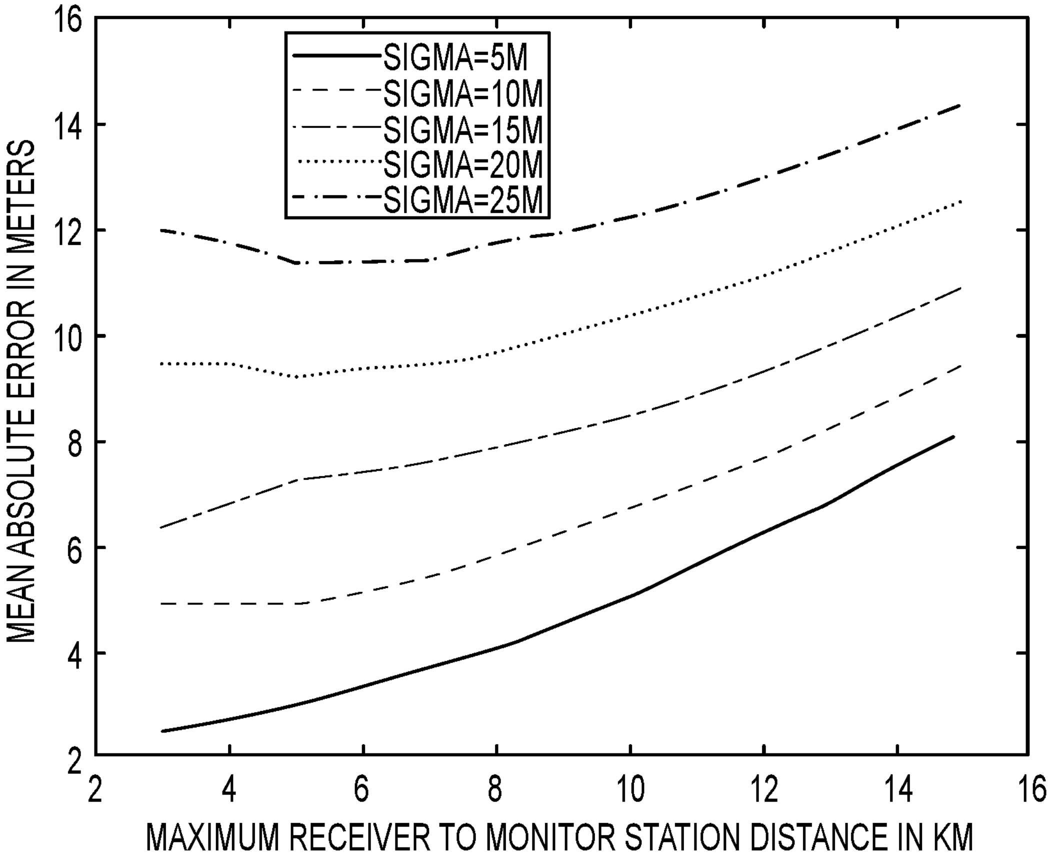
FIG. 6 presents the results of a simulation of the FSN technique of the present invention showing the accuracy of the method and its relationship to the size of the ROI. This simulation uses a small configuration of far sources: 2 LEOs and 3 GEOs. The noise indicated is the measurement noise.

FIG. 6 shows the performance of a configuration with 3 GEO satellites and 2 LEO satellites simulated in each instance over 10,000 runs. The satellite ephemeris error is randomly generated with a magnitude of 10 km. Both the Monitor Station (MS) and the Receiver make measurements on the signals from the satellites. Measurement standard deviations from 5 m to 25 m are considered in steps of 5 m. Monitor station to receiver distances are considered from under 15 km. The error plotted is the mean absolute error over the stated number of runs.

The receiver under test is assumed to have a drifting clock. Thus, there are 4 unknowns: the 3-D coordinates of the receiver, and the clock bias of the receiver. The 5 sources signals (3 GEO and 2 LEO) are thus sufficient to solve for the unknowns. The method used for solution is one shot and independent from measurement set to measurement set. When a filter (such as an Extended Kalman Filter) is used, the accuracy will likely improve. In addition, a terrain map for further gain can also be exploited. And certainly, as commented on previously, any other form of measurement can be added to the novel measurements of this invention.

The utility of the present invention is apparent by this diversity in application. For example, the FSN system of the present invention can be combined with other traditional measurements to provide a navigation solution. Traditional measurements such ranges, time differences of arrival, Doppler measurements, Angle of Arrival (AOA) measurements, etc., can be supplemented with the techniques presented herein. Moreover, the present invention can be used on signals that are not very far, that is not far sources, provided the ROI is small. For example, with DTV, one can reduce the diameter of the ROI to 1 km and provide accurate navigation within that region.

The present invention is also applicable to very distant signals. For example, signals emanating from sources on the moon or other planets (such as visualized in SpaceX Mars colonization plans) will exhibit a planar wavefront over very large dimensions, even hundreds of km. In such cases, it can be possible for a single MS to provide positioning over very large areas, or at least provide one or more supplementary measurements that feed a positioning algorithm. It is also possible for a MS to situate itself at a landmark in a region of interest even in the complete absence of GPS and thus provision the nodes of a mission with data sufficient for each other node to position itself. Alternatively, a mobile MS with specialized CRPA antennas that could dynamically position itself, overcoming GPS jamming and where it is able to receive multiple far source signals, while provisioning data to Rx nodes in the region which can then locate themselves.

Note that in every case, and particularly when considering very far sources, the unit vectors of interest are to be calculated in such a manner as to account for the time of travel of the signal from the far source to the ROI. This can be easily calculated to a sufficient approximation, given the ephemeris and the ROI. The consideration of interest in these cases is where the far source was positioned in inertial space that amount of time prior to the determined time stamp on the signal burst at the MS or node N. While one could ignore this effect and simply allow it to be absorbed into the ephemeris uncertainty, better accuracy would be obtained by making the known correction.

Another application of the present invention is a MS that self-locates using GNSS or other LEO satellites and then serves as the aiding data source to implement the method detailed here to enable navigation for all Rx s in the region of interest. The MS can in this instance continue to improve its self-location, such as would happen when it can observe more than three LEO satellites. Thus, the MS continues to improve its estimate of position over time, and as a result and over time, the navigation performance of each Rx also improves. Multiple such MS can be made operational for added robustness and resilience in the solution. Note that multiple MSs would reduce the noise and provide diversity in the measurements. In addition, once a first location estimate is derived, one can higher weight the MS units that are in an optimal geometry for minimizing positioning error for the Rx.

Multiple MS can also be used in a different setting to potentially address enhancing the accuracy of the unit vectors. This can enhance the accuracy of FSN. Multiple MS units can jointly compute the best unit vector representation for a signal in a given ROI. The MS know where they are and have good clocks, and hence can solve for the best unit vector representations to be applied. In fact, computing the unit vectors of interest in this manner would be viable even with no knowledge of ephemeris for the far sources. The MS units would jointly compute the unit vectors that best match the FSN equations, and then provide these unit vectors to all nodes requiring positioning. Note that the bending of a far source signal due to various phenomena in the channel common to nodes of the ROI can be generally dealt with by considering that the excess delays so generated (with respect to the delay of the LOS path) are the same at all nodes in the region. This is a fair assumption for reasonably sized ROIs as considered here. Thus, when nodes subtract their time of arrival measurements on the signal from the far source, as in this disclosure, these cancel out, resulting in the geometrical equivalence to ideal LOS propagation.

Lastly, the present invention can provide an alternative or supplement to traditional GPS, thus providing robustness in navigation for consumers. This can also serve as a cross check against GPS derived location, enabling the detection of GPS spoofing. A cellular network is an attractive candidate for FSN since the MS units are available with no build out, the cellular network provides the built-in capability to share measurement information, and with the addition of an App running on smart phones can provide a full implementation of FSN as a resilience and security measure.

In another embodiment of the present invention, Far Source Navigation (FSN) enables a group of spatially distributed receivers to navigate without the use of any external assistance such as a monitor station. Such an implementation includes two or more spatially distributed receivers as in a typical mission context. Four or more spatially distributed far sources (three if any receiver has a precise clock) are combined with one or more local precise sources (or having precise characterization of one or more of the far sources). A low bandwidth message exchange between receivers enables data exchange and enables receiver motion over time.

Another example of an application of one or more embodiments of the present invention is that of a shipping port or an aircraft terminal. At a control tower on land within the port, one could conceive of placement of a MS. Every ship entering or leaving could be considered as a potential Rx. If FSN is implemented with respect to some set of far sources, then each Rx can derive positioning and navigation information. This information can be continuously compared to an available GPS location derived from using a GPS receiver for precise positional determination.

If at any time the two separately derived locations disagree, this would be an indication of polluted signals, and this information can then be considered at the control tower for remedial measures.

When GPS is spoofed, such a spoofing attack often begins by slowly transferring the Rx from a true source (GPS) to a spoofing source. This can be done by very gradually transitioning the GPS Gold codes (PRN codes) from the true codes to the codes emitted by the spoofer. A next step is then to thus force the Rx to read spoofed navigation data embedded on the false codes. This navigation data can then force the Rx to unknowingly locate itself at a wrong position. Even a small error can have many unforeseen consequences, as for example in the port setting where two ships collide, or one runs aground.

A further integrity or resilience determining measure utilizing FSN would be to use the GPS Gold codes directly in FSN (ignoring the embedded navigation data). This will then generate a location estimate that can be compared to the GPS receiver location estimate derived from using the navigation data. This will result in a third mutually conflicting location estimate. Three location estimates are formed:

a) the GPS Rx location estimate (blind to the spoofing event), b) the FSN Rx location estimate, c) a Rx location estimate using only the GPS Gold codes, and treating the GPS satellites as far sources, thus applying FSN to the Gold codes and ignoring the GPS navigation data.

A high confidence GPS spoofing determination is achieved.

The present invention is also applicable in instances of GPS jamming. Traditional GPS requires acquisition of the chip sequence (Gold codes) and demodulation of the navigation bits (L1 bits in the case of L1 C/A) to compute position. The present invention can perform PNT (navigation) without demodulation of the bits with almanac data for coarse satellite position data (which can last many hours or even days), and one could integrate through the jammers enough to get just the detection of the C/A code (perhaps through coherent and non-coherent integration over longer periods). Not having to demodulate the entire signal permits the Rx to implement FSN even if some segments of the signal cannot be recovered, permitting PNT with fragmented (due to jamming) signal components. Another alternative to almanac data would be the use of TLE derived approximate ephemeris as indicated earlier on; any means of obtaining approximate imprecise ephemeris is sufficient.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

In a preferred embodiment, one or more portions of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Figure 7:
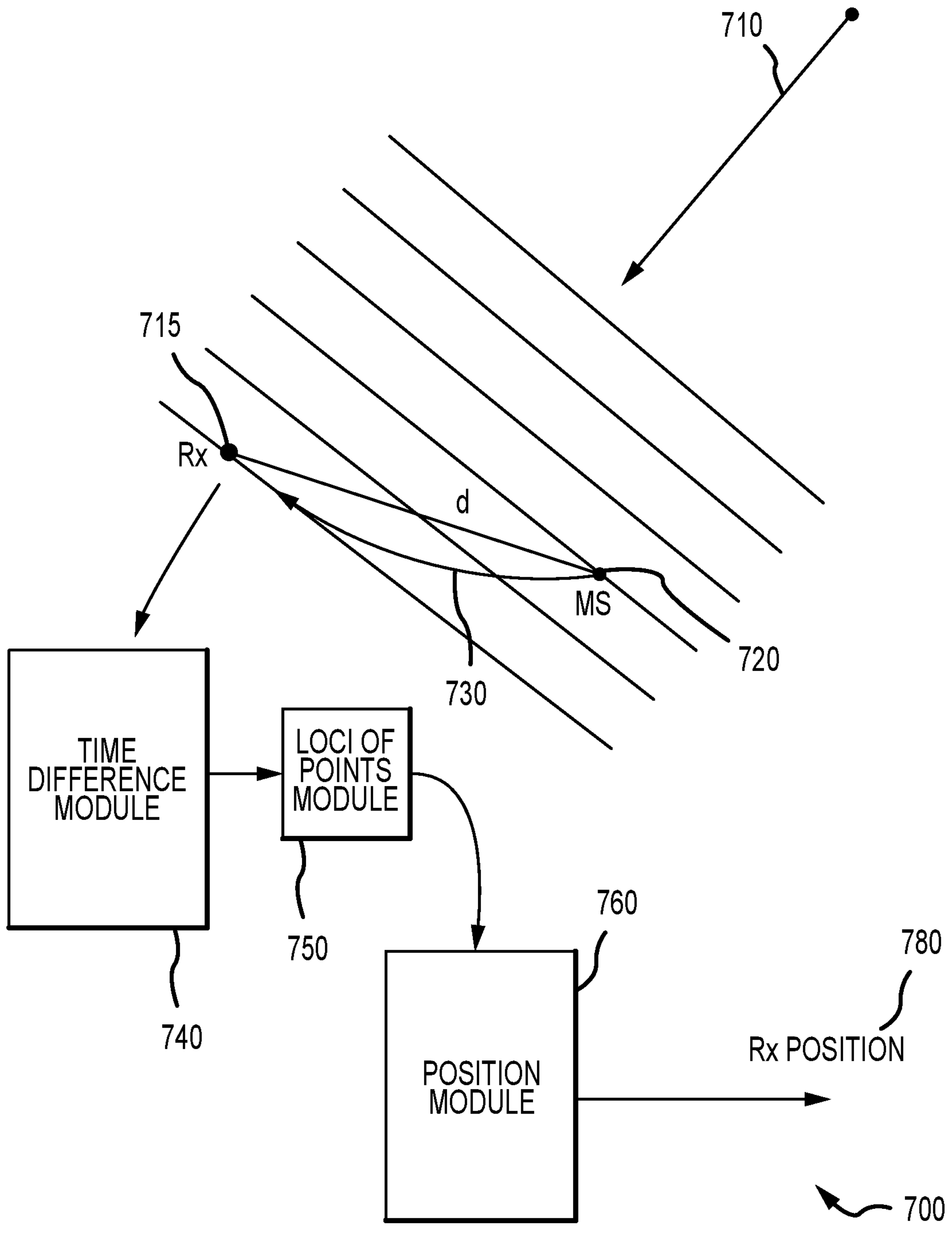
FIG. 7 presents a high-level view of a system for far source positional determination according to one embodiment of the present invention.

FIG. 7 presents a high-level view of a system 700 for far source positional determination. As presented herein a far source signal 710 is received by a first 715 and a second receiver 720. In one embodiment, information regarding the time of arrival of the signal at the second receiver is communicated 730 to the first receiver.

A time-difference module 740, communicatively coupled to the first receiver 715 is configured to measure one or more time-difference of arrivals, each time-difference of arrival being difference between arrival of one of the one or more signals at the first receiver and arrival of the one of the one or more signals at the second receiver.

A loci of points module 750, communicatively coupled to the time-difference module 740, determines, for each signal, a loci of points, forming one or more loci of points wherein each loci of points is a distance from the second receiver on which the first receiver resides based on the respective one or more time-difference of arrivals.

And a position module 760, communicatively coupled to the loci of points module identifies a relative position 780 of the first receiver from the second receiver based on an intersection of the one or more loci of points.

Generally, program modules include routines, programs, objects, components, data structures and the like that perform tasks or implement abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be in both local and remote memory storage devices.

Figure 8:
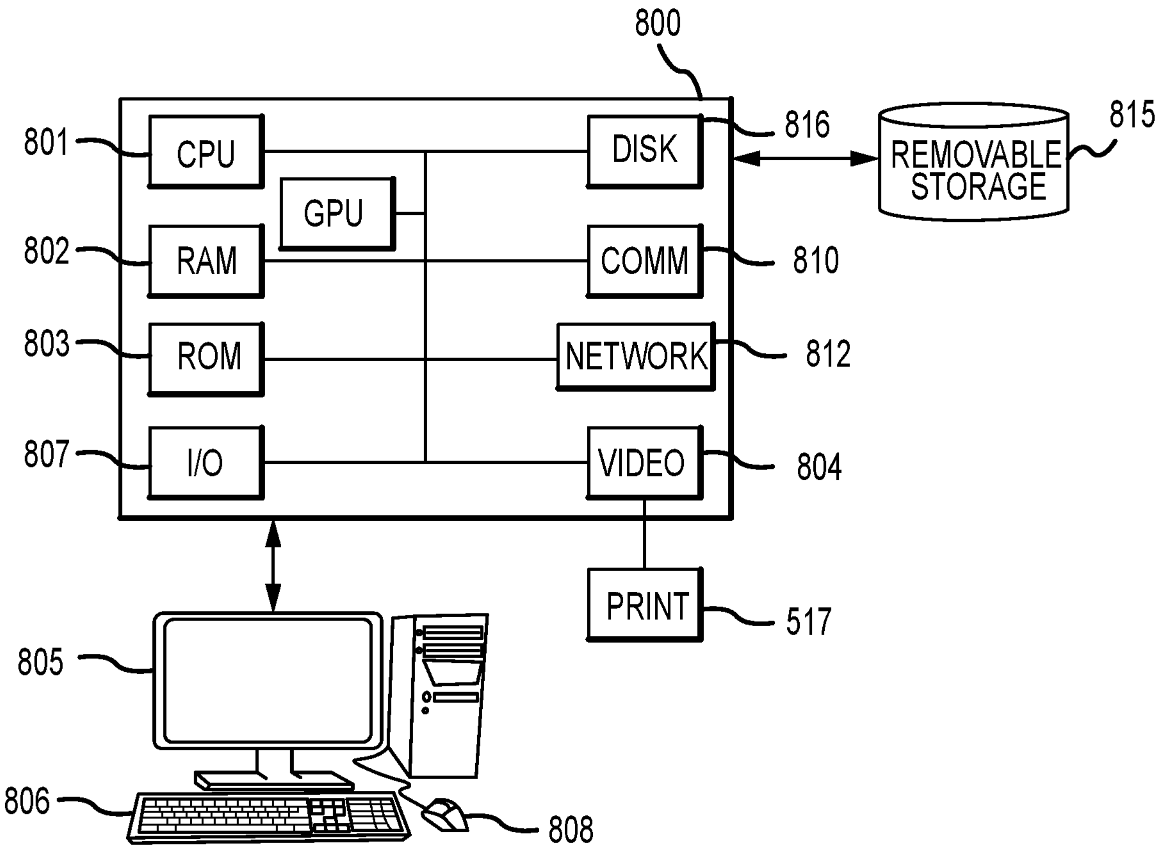
FIG. 8 is a block diagram of a computer system suitable for implementation of one or more embodiments of far source positional determination.

One of reasonable skill will also recognize that portions of the present invention may be implemented on a conventional or general-purpose computer system, such as a personal computer (PC), server, a laptop computer, a notebook computer, a handheld, or pocket computer, and/or a server computer. FIG. 8 is a very general block diagram of a computer system in which software-implemented processes of the present invention may be embodied. As shown, system 800 comprises a central processing unit(s) (CPU) or processor(s) 801 coupled to a random-access memory (RAM) 802, a graphics processor unit(s) (GPU) 820, a read-only memory (ROM) 803, a keyboard or user interface 806, a display or video adapter 804 connected to a display device 805, a removable (mass) storage device 815 (e.g., floppy disk, CD-ROM, CD-R, CD-RW, DVD, or the like), a fixed (mass) storage device 816 (e.g., hard disk), a communication (COMM) port(s) or interface(s) 810, and a network interface card (NIC) or controller 811 (e.g., Ethernet). Although not shown separately, a real time system clock is included with the system 800, in a conventional manner.

CPU 801 comprises a suitable processor for implementing the present invention. The CPU 801 communicates with other components of the system via a bi-directional system bus 820 (including any necessary input/output (I/O) controller 807 circuitry and other "glue" logic). The bus, which includes address lines for addressing system memory, provides data transfer between and among the various components. Random-access memory 802 serves as the working memory for the CPU 801. The read-only memory (ROM) 803 contains the basic input/output system code (BIOS)—a set of low-level routines in the ROM that application programs and the operating systems can use to interact with the hardware, including reading characters from the keyboard, outputting characters to printers, and so forth.

Mass storage devices 815, 816 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 8, fixed storage 816 stores a body of program and data for directing operation of the computer system, including an operating system, user application programs, driver, and other support files, as well as other data files of all sorts. Typically, the fixed storage 816 serves as the main hard disk for the system.

In basic operation, program logic (including that which implements methodology of the present invention described below) is loaded from the removable storage 815 or fixed storage 816 into the main (RAM) memory 802, for execution by the CPU 801. During operation of the program logic, the system 800 accepts user input from a keyboard and pointing device 806, as well as speech-based input from a voice recognition system (not shown). The user interface 806 permits selection of application programs, entry of keyboard-based input or data, and selection and manipulation of individual data objects displayed on the screen or display device 805. Likewise, the pointing device 808, such as a mouse, track ball, pen device, or the like, permits selection and manipulation of objects on the display device. In this manner, these input devices support manual user input for any process running on the system.

The computer system 800 displays text and/or graphic images and other data on the display device 805. The video adapter 804, which is interposed between the display 805 and the system's bus, drives the display device 805. The video adapter 804, which includes video memory accessible to the CPU 801, provides circuitry that converts pixel data stored in the video memory to a raster signal suitable for use by a cathode ray tube (CRT) raster or liquid crystal display (LCD) monitor. A hard copy of the displayed information, or other information within the system 800, may be obtained from the printer 817, or other output device.

The system itself communicates with other devices (e.g., other computers) via the network interface card (NIC) 811 connected to a network (e.g., Ethernet network, wireless network technology, or the like). The system 800 may also communicate with local occasionally connected devices (e.g., serial cable-linked devices) via the communication (COMM) interface 810, which may include a RS-232 serial port, a Universal Serial Bus (USB) interface, or the like. Devices that will be commonly connected locally to the interface 810 include laptop computers, handheld organizers, digital cameras, and the like.

Figure 9:
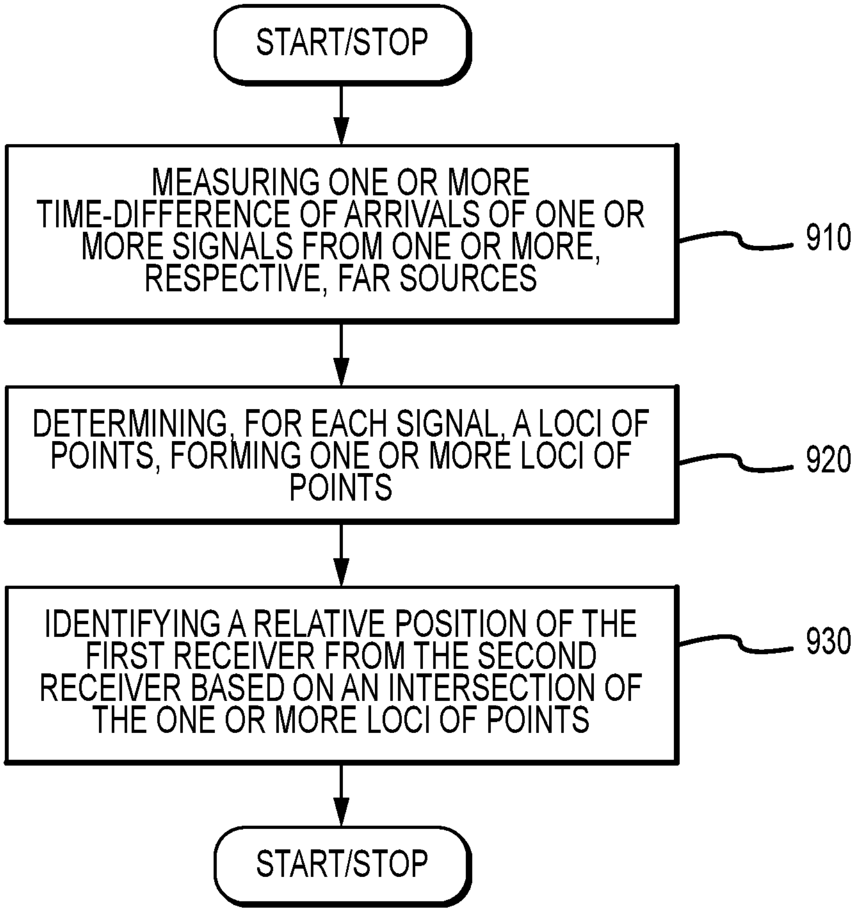
FIG. 9 presents a flow chart of one methodology, according to the present invention, for far source positional determination.

FIG. 9 provides a high-level view of a flowchart of a methodology for far source positional determination. The process begins with measuring 910 one or more time-difference of arrivals of one or more signals from one or more, respective, far sources. Each time-difference of arrival is between the difference of arrival of each of the one or more signals at a first receiver and arrival of each of the one or more signals at a second receiver.

The method continues by determining 920, for each signal, a loci of points. Each locus of points is at a distance from the second receiver on which the first receiver resides based on the respective one or more time-difference of arrivals. Using that information and as described herein the process ends by identifying 930 a relative position of the first receiver from the second receiver.

Dynamic Tracking

In another aspect of the disclosed invention, a method for differential positioning is detailed wherein an aided receiver, or node, navigates from point-to-point using signals from far sources wherein both the position of the source and the signal time of transmit are imprecisely characterized. In another embodiment, a Kalman Filter (KF) is used to provide differential positioning information for an aided receiver in dynamic motion over a sustained time duration. The far source set for the disclosed dynamic tracking methods includes LEO, MEO, and GEO satellite sources. The dynamic tracking system selects the best far sources and best aiding receivers, or nodes, available to an aided node at a given time. By continuously determining and selecting the best set of aiding nodes and the best set of far sources, the dynamic tracking system navigates the aided node as accurately as possible. Through this process, the dynamic tracking system also develops and uses a set of metrics that characterize any application of differential positioning for navigation.

Figure 10:
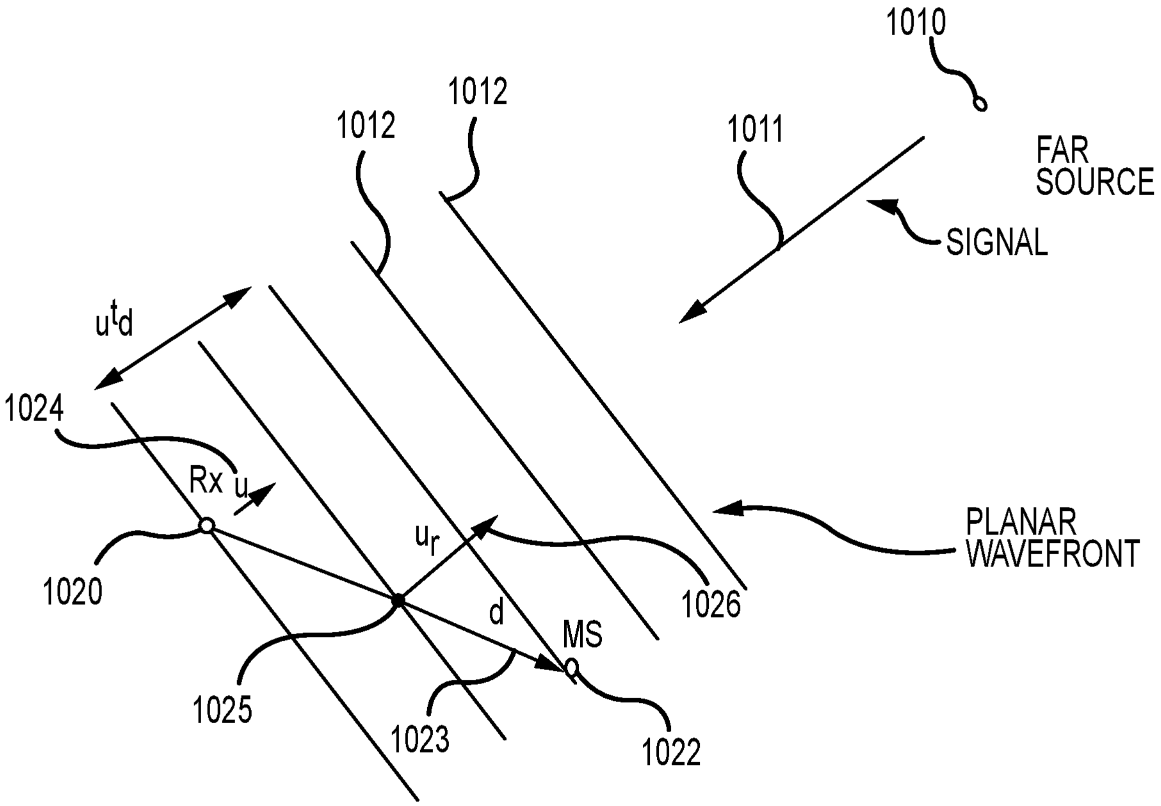
FIG. 10 presents a high-level view of a system for far source positional determination according to one embodiment of the present invention.

The disclosed dynamic tracking methods are built upon the basic far source navigation methods described above. With reference to FIG. 10, a far source 1010 broadcasts a signal 1011 in the vicinity of an aided node or Receiver (Rx) 1020, and an aiding node or Monitoring Station (MS) 1022. The nodes can communicate with each other, or at minimum Rx can receive data from MS. The signal 1011 is assumed to be a planar wavefront 1012 in the vicinity of the nodes to simplify the calculation. Thus, if the distance from Rx to MS is a vector d 1023, and u 1024 represents a unit vector pointing towards the far source 1010 from either node, then the difference in time of arrival of a signal from the far source measured at Rx and MS is exactly ($u^t d/c$) where d is the vector pointing from Rx to MS and c is the speed of light. From these relationships, as detailed in Paragraphs to above, the following equation (FSN Equation) is derived:

$$\begin{bmatrix} r_m - r \\ \delta \end{bmatrix} = (V^t V)^{-1} V^t \begin{bmatrix} m_1 \\ m_2 \\ m_3 \\ \cdot \\ \cdot \\ m_N \end{bmatrix}.$$

The FSN Equation allows for the determination of the position of the aided receiver as well as its local clock bias or clock delay. As a method of FSN, an algorithm using the FSN Equation is most useful because it is accurate in the face of large ephemeris error in the far source location. Because of this resilience, as long as there are data communications from the aiding nodes to the aided node, FSN is possible.

The process of using the FSN Equation for the position and timing of an aided node 1010 is iterative. First an approximate first order location of Rx is determined. With the first order location in hand, the algorithm modifies all unit vectors 1024 to reflect the now approximately known location of Rx as their origin, which conceptually rotates the planar wavefronts 1012 accordingly. As a second order refinement, the mid-point 1025 of d is used as the origin for a refined set of unit vectors $u_r$ 1026. For the most accurate measurement, the unit vectors are derived to accurately represent the time at which the signal 1011 emanated from the far source. This adjustment minimizes error particularly for distant and fast-moving sources. Using the known location of MS and the ephemeris error of the far source 1010, the time of flight from the far source to MS can be approximated which provides a still better vector to the source than the $u_r$ approximation.

As a further refinement, the positioning algorithm can include multiple aiding nodes, each providing time of flight measurements from their location to the far source, and providing a unit vector with an origin at the location of each aiding node. When multiple aiding nodes are used, the form of the matrix V is slightly different, since the planes to be intersected are now formed with reference to multiple points, rather than the single point MS. The resulting modified FSN Equation allows the application of a Kalman Filter to perform dynamic tracking of and aided node while in motion.

The Kalman Filter

A Kalman filter is a recursive linear quadratic estimation algorithm that includes a prediction phase and an update phase. The prediction phase produces estimates of current state variables and a level of uncertainty for each variable. The KF then receives a measurement of the state variables and performs the update phase, wherein the previous estimated state values are updated with a weighted average that gives greater weight to estimates with higher certainty. The effect of the KF is to provide estimates of the state variables that are more accurate than a single measurement of the variables. Dynamic tracking uses a KF with 12 state variables, which include position, velocity, and acceleration in three dimensions, the clock bias, the rate of change of the clock bias, and the rate of change of the latter.

The dynamic tracking H matrix represents the relationships (mapping) among the measurements, e.g., position, velocity, etc., the measurements at Rx, MS, and other aiding nodes, and the 12 state variables, and is derived from the set of unit vectors. When all the measurements used in the H matrix derive from the FSN Equation algorithm, the H matrix represents a linear relationship, so that the measurements are a matrix operation applied to the state variables. When the H matrix is linear as described, the KF for dynamic tracking becomes a robust, low cost computation solution.

The matrix $$V = \begin{bmatrix} u_1^T & 1 \\ u_2^T & 1 \\ u_3^T & 1 \\ u_4^T & 1 \end{bmatrix}$$

is a core component of the H matrix. In dynamic tracking scenarios, not only does the aided node move, but the aiding nodes may move, and the far sources move. Because of constant variation, the unit vectors in this matrix are continuously variable functions of both the estimated position of Rx, and the positions of the aiding nodes. Use of a time-variable H matrix is thus critical to dynamic tracking performance.

Even while in motion, MS and any other aiding nodes are assumed to have precise current location and clock data. For example, in the case where Rx is being denied GPS data due to malicious activity, but the aiding nodes have access to GPS data, the aiding nodes will maintain PNT self-information via GPS receivers. Therefore, for each far source (indexed by nn), a line in the matrix H_far is constructed as follows:

$$\text{H\_far}(nn,\ :) = -V(nn,\ :);$$

With the final H matrix being constructed as follows, where H_kf represents the matrix at iteration k of the Kalman filter:

$$\begin{gathered} \%\ \text{state variables in } H \text{ matrix} \\ \text{H\_kf}(:,1) = \text{H\_far}(:,1);\%\ \text{position} \\ \text{H\_kf}(:,4) = \text{H\_far}(:,2);\%\ \text{position} \\ \text{H\_kf}(:,7) = \text{H\_far}(:,3);\%\ \text{position} \\ \text{H\_kf}(:,10) = \text{H\_far}(:,4);\%\ \text{clock} \end{gathered}$$

in which the matrix H_kf is of size (k×12), and the indices reference matrix columns. Matrix size can vary depending on the number of far sources used, for example, a new far source may be incorporated into the measurement, or a far source may be excluded due to poor metrics. The use of selection metrics to include or exclude a far source from the calculation of aided node FSN information is a key factor making dynamic tracking possible. Equally important, the dynamic tracking H matrix is essentially the same matrix used in the static case FSN solution, which allows use of an important static metric for dynamic tracking.

The Dynamic Framework

Figure 11A:
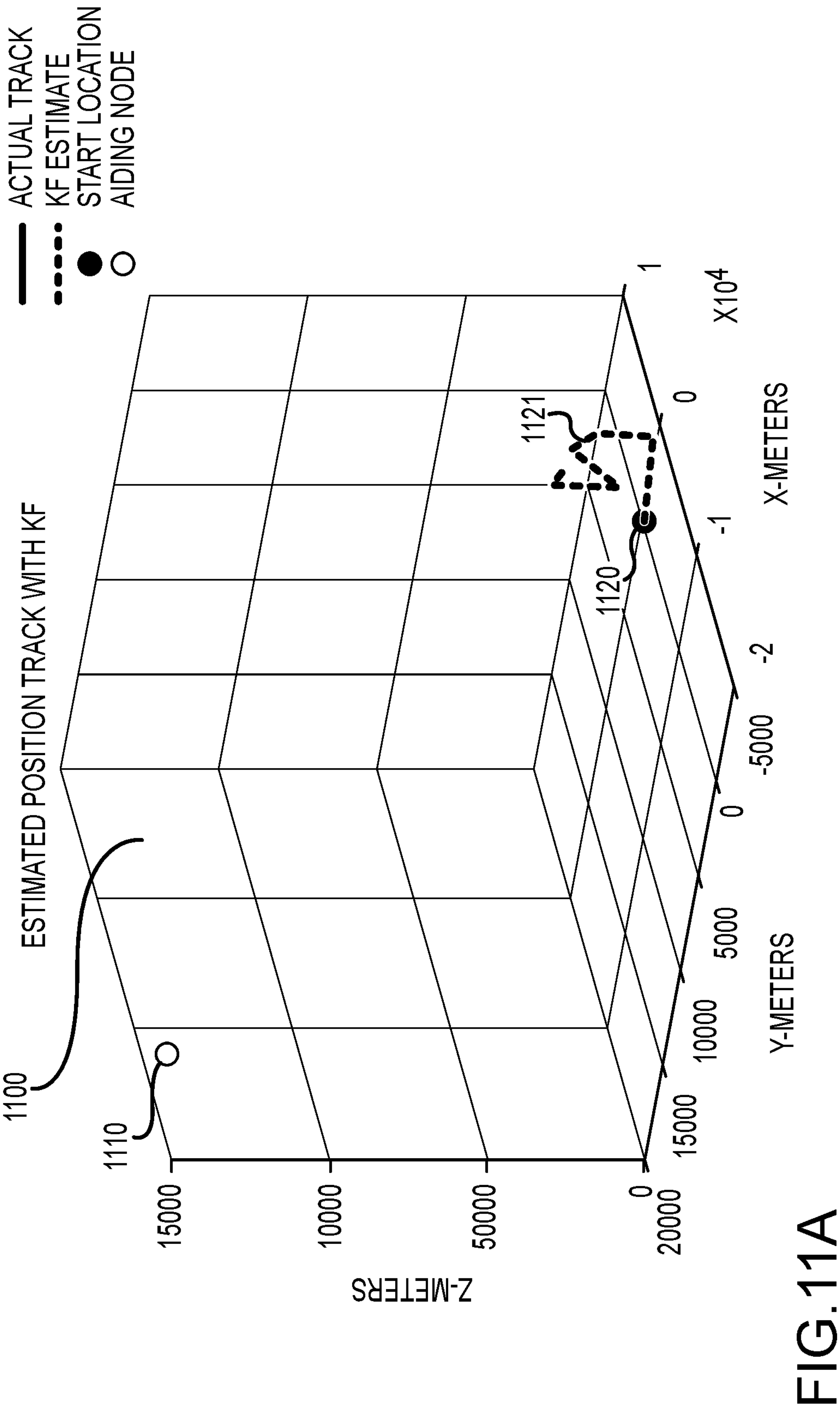
FIG. 11A presents a perspective view of showing use of a Kalman Filter for far source positional determination according to one embodiment of the present invention.
Figure 11B:
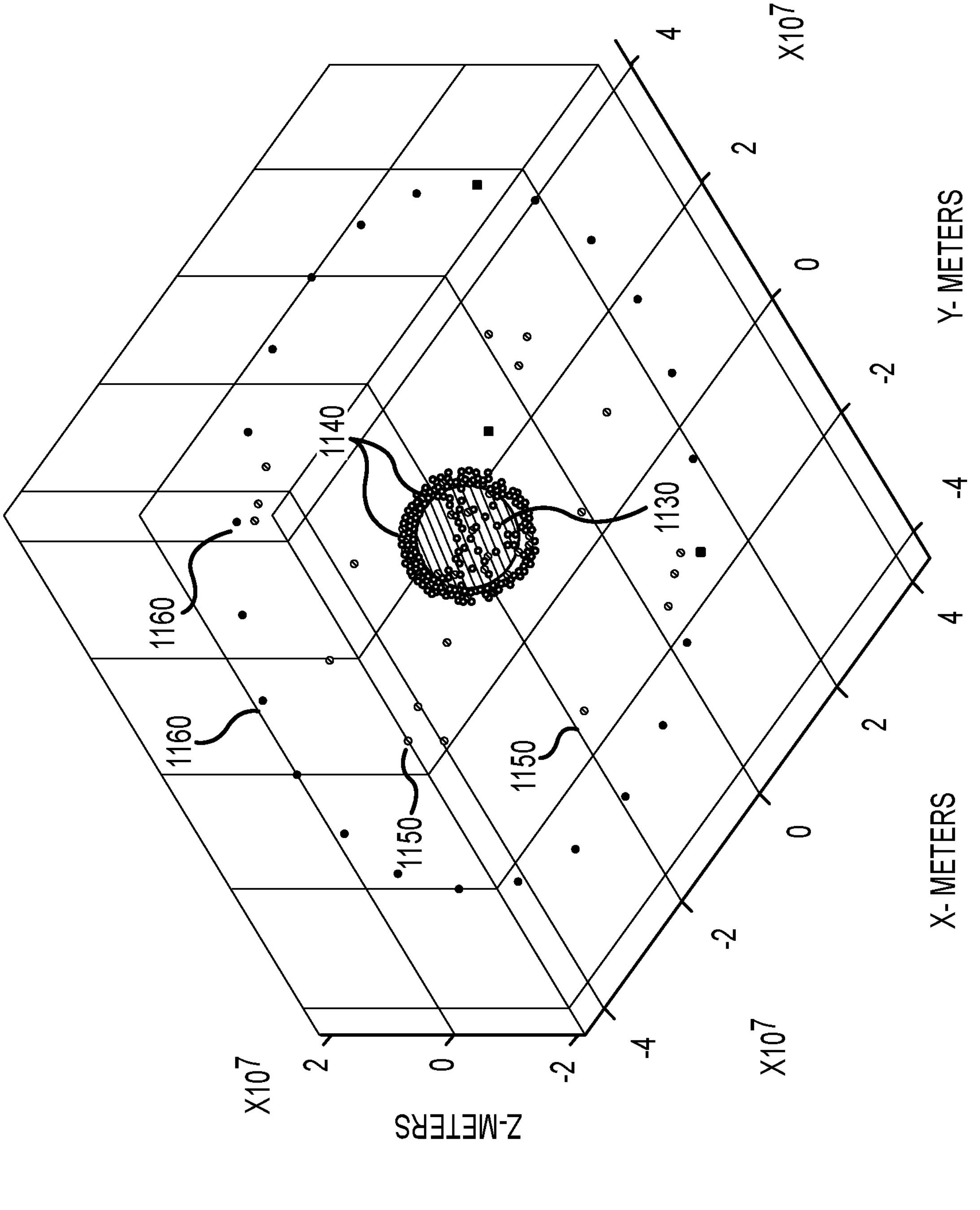
FIG. 11B presents a high-level view of example far source navigation sources according to one embodiment of the present invention.

With reference to FIG. 11A, a three-dimensional navigation space 1100 is depicted showing the relative orientations of an aiding node 1110 and an aided node 1120. Space is represented by three axes, with x and y representing lateral directions and z representing the vertical direction. As shown, Rx 1120 is at position (0,0,0), while MS is at approximately (−1.5 meters, 20,000 meters, 14,000 meters). Under dynamic tracking, Rx moves along the depicted track 1121 at speeds of up to 140 kilometers per hour (kph), making abrupt accelerations and decelerations, and tight turns for a duration of 10 minutes. During this time period, the dynamic tracking system uses far sources drawn from multiple satellite constellations as shown in FIG. 11B. FIG. 11B depicts the earth 1130 surrounded by a snapshot of representative LEO 1140, MEO 1150, and GEO 1160 satellite constellations oriented in three-dimensional space. The aggregate number of satellites typically available in middle northern latitudes is around 200, and of these 24 are GEO satellites, 24 are MEO, and the remaining are LEO satellites. A subset of these 200 satellites will be in view of both the aiding node and aided node, and a smaller subset will have signal beams that illuminate the region of interest (ROI).

The Selection of Far Sources and Aiding Nodes

Selection of far sources during dynamic tracking is an ongoing task for the system. Because the aided node 1120 is moving, as are the LEO 1140 and MEO 1150 satellites with respect to the ROI, the set of satellites suitable for navigation constantly changes. Suitability for inclusion in the set of visible satellites is partially dependent on a satellite's elevation relative to the ROI, which can be set at a minimum value, e.g., 5 degrees. Use of elevation cut-off value means that only those satellites with greater than 5 degrees elevation will be considered visible to the aided node and aiding nodes, thus helping ensure visible far sources provide adequate geometry for an FSN solution. Satellites that are directly overhead in relation to the ROI may also be excluded in the selection process since FSN works best with satellites within a window or range of elevations, e.g., 25 to 85 degrees.

Due to the constantly changing geometries of the satellite signals and their interaction with the node locations, the usable far sources are likely a smaller subset of the visible far sources. Because the set of visible and useable far sources varies with time, the dynamic tracking system recursively determines the best set of far sources to minimize positioning error for the aided node. The dynamic tracking system performs this task through communication among aiding nodes, which identify those visible far sources that provide the best geometries with the aiding nodes as a far source selection criterion. The aiding nodes thus develop metrics for evaluating the suitability of a far source for use in an FSN solution given the aiding nodes and aided node approximate locations. The selection metrics specifically inform the dynamic tracking system whether a particular visible far source when used with a particular single aiding node is suitable for developing an FSN solution for the aided node.

Selection metrics may be used to inform the selection of far sources and aiding nodes in different scenarios that arise in dynamic tracking. When few far sources and one aiding node are available, the metrics are used to rank the relative value of each source in navigation. When many far sources and one aiding node are available, the metrics inform the selection of optimal sets of such far sources to be used with the aiding node. If only one far source and many aiding nodes are available, the metrics inform whether that far source should be used, and if so, which aiding nodes would perform best with that node. When few far sources and many aiding nodes are available, the metrics inform whether those far sources should be used, and if so with which aiding nodes. When many far sources and many aiding nodes are available, the metrics inform the selection of optimal sets of far sources and aiding nodes.

Metrics for Precise Dynamic Tracking

Orthogonality Metric

The orthogonality metric arises out of the simplest scenario facing the dynamic tracking system, namely when there is a single far source and a single aiding node. From this scenario, the system obtains a single measurement, and it is desirable to quantify the expected error in that measurement.

As an initial matter, certain assumptions are required to derive the orthogonality metric, namely the far source is assumed to have a reasonably known ephemeris. The far sources of interest for FSN may have ephemeris data derived from TLE data, satellite operators may provide access to ephemeris error, ephemeris errors may be derived from publicly available information, or may even be derived from FSN observations. As a result, some satellite constellations may have ephemeris errors under 1 km, for example, while others may have errors up to 5 km.

If TLE data is used to derive ephemeris error, the predominant error will be in the in-track or along track direction, i.e., along the path of the satellite as it orbits. Along-track error contributes nearly 90 percent (%) of the total error in ephemeris data, making it a key parameter to improve. Therefore, assuming that the predominant error is in the in-track direction, dynamic tracking methods that directly or indirectly minimize this error can see substantial PNT accuracy gains. Returning to the simplest form of the FSN equation first presented in Paragraph [0097]:

$$c(t_R - t_m) = m = -u^T(r - r_m) + \delta + n.$$

While measurement noise n is included in the equation above, it will be ignored for the time being for simplicity. Ephemeris error contributes to navigation imprecision because it causes the unit vector to be incorrectly determined. The unit vector is determined using the following expression:

$$u = \frac{E_t + \mu - P}{\|E_t + \mu - P\|},$$

where $E_t$ is the true yet unknown ephemeris (as a vector in three dimensions) at time t, μ is the ephemeris error vector, and P is the reference origin location. Substituting for u provides:

$$c(t_R - t_m) = m = -\frac{(E_t + \mu - P)^T}{\|E_t + \mu - P\|}(r - r_m) + \delta,$$

which means the ephemeris error u results in a measurement error e given by the following:

$$e = \frac{\mu^T}{\|E_t + \mu - P\|}(r - r_m).$$

This expression of measurement error shows that measurement error is dominated by the projection of the ephemeris error vector in the direction of the line joining the aiding node to the aided node.

Since ephemeris error is predominantly in the in-track direction, measurement error may be reduced by selecting an aiding node so that the vector from the aiding node to the aided node is orthogonal, or nearly orthogonal, to the in-track direction. Testing whether the aiding node to aided node vector is orthogonal to the in-track direction therefore becomes a vital metric.

The orthogonality metric $M_o$ for an aiding node is shown by the equation below, and is defined as the projection of a unit vector in the in-track direction ($u_\mu$) of the far source onto a unit vector in the direction of the aided node from the aiding node ($u_{r-r_m}$):

$$M_o = u_\mu^T u_{(r-r_m)}.$$

Ideally if the ephemeris in-track vector is near orthogonal to the vector joining the estimated location of the aided node and the aiding node, a minimum error due to ephemeris imprecision will exist. When $M_o=0$, for example, the impact of ephemeris error would be severely reduced, since the entire in-track component of error has been removed. The orthogonality metric may be used to select among several aiding nodes, for example, if several aiding nodes are arranged in a ring around an aided node, then some aiding nodes will contribute large errors to the FSN solution while others would contribute smaller errors. All other factors being equal, selecting the aiding node with the smallest orthogonality metric score would provide the best positioning measurement for a given aided node and far source combination.

Error Magnitude Metric

Returning to the measurement error equation in Paragraph above, it is apparent that the larger the denominator, the smaller the measurement error. The size of the denominator is primarily driven by the distance between the far source and the ROI, so that measurement error for a far source is minimized when it is furthest away from the ROI. The change in distance proves to be more significant than the ephemeris error contribution to the denominator, which enables the comparison of measurement errors for all categories of satellites (whether LEO, MEO, GEO, etc.). If the ephemeris error contribution to the denominator is ignored, the error equation becomes:

$$e = \frac{\mu^T}{\|E_t - P\|}(r - r_m).$$

Ignoring the contribution of μ to the denominator is reasonable given that the ephemeris error is on the order of a few kilometers as compared to the distance to the far source which is on the order of hundreds to many thousands of kilometers. For example, GEO satellites have distances in the range of 40,000 to 80,000 km, depending on the elevation angle. The error magnitude metric $M_a$ then becomes:

$$M_a = \frac{\|\mu\|}{\|E_t - P\|}\|r - r_m\|,$$

which is the ratio of the product of the magnitude of the ephemeris error times the distance between aiding and aided nodes to the distance from the ROI (or aiding node) to the far source. Combining the orthogonality metric and error magnitude metric, the measurement error can be written as follows:

$$e = M_o M_a,$$

which provides a simple expression of the preponderance of the error. The measurement error so expressed may be computed easily at a given time, given the geometry of the far source, the aiding node location, and a first order approximation of the aided node location. It is apparent from the equation that reducing the size of either metric will reduce the overall error.

As indicated, the measurement error metric is most useful after determining a first order approximate location of the aided node. The aided node approximate location may be determined using FSN measurements, inertial guidance, ground-based navigation aids, or other suitable means. Often, simply knowing what signals, from far sources or otherwise, the aided node can observe is sufficient to make a first approximation; this being particularly true when the observations are made on LEO satellites with localized signal beams. With an initial aided node location, and noting that positioning errors will be much smaller than the typical distance between aided node and aiding node, the dynamic tracking system can compute vector directions. Now the system can calculate a second order aided node location wherein the metrics can be computed and used. The metrics then inform the choice of aiding nodes and far sources for inclusion in the FSN solution to minimize navigation error. FSN initiation may benefit from a bootstrapping procedure, wherein the first step is to obtain an approximate aided node location by whatever means, and then iterate with the use of metrics to develop a more precise location. Bootstrapping may only need to be done at FSN initialization, or very rarely thereafter, since KF tracking will usually provide a sufficient approximation of the aided node's location.

In cases where the ephemeris error is essentially random or uncorrelated with the far source in-track direction, e.g., some GEO satellites, the error magnitude metric supplies an error bound. The bound is given as:

$$e < M_a.$$

As an example, assume a GEO far source having a slant range of 60,000 km, an ephemeris error of 5 km, and an aiding node 25 km distant from the aided node. The calculated error bound becomes e<2.083 meters, which is the error (geometric error or bias) in a single measurement. If many far sources are available in a good spatial arrangement, some mutual error cancellation will occur, reducing the possible maximum error. For well-spaced GEO far sources, the dominant measurement error is not the geometrical error (bias), rather it is the contribution of noise to measurement error.

Dilution of Precision Metric

Where the orthogonality and error magnitude metrics are generally applicable to simple FSN scenarios, metrics applicable to a full dynamic tracking scenario will now be discussed. Returning to the H matrix, its dependence on the matrix V is evident in the following expression first discussed in Paragraph above:

$$\begin{bmatrix} r_m - r \\ \delta \end{bmatrix} = (V^T V)^{-1} V^T \begin{bmatrix} m_1 \\ m_2 \\ m_3 \\ \vdots \\ m_N \end{bmatrix}.$$

Positioning error may be considered a measurement vector comprising a vector of errors, wherein first order errors are dominated by measurement noise. Applying matrix manipulations to the above equation gives the following dilution of precision metric $M_{DOP}$:

$$M_{DOP} = \sqrt{\mathrm{trace}[A * A^T]},$$

wherein $A=(V^TV)^{-1}V^T$. The dilution of precision metric, or geometric dilution of precision (GDOP), depends on the matrix V, which in turn is a function of the unit vectors, as seen in the case of four far sources (1, 2, 3, and 4) shown below:

$$V = \begin{bmatrix} u_1^T & 1 \\ u_2^T & 1 \\ u_3^T & 1 \\ u_4^T & 1 \end{bmatrix}.$$

V is a matrix wherein the first three columns contain the components of the unit vectors in each of three dimensions, while the fourth column is a column of 1's. Notably, V depends on the way a particular FSN solution is developed. For example, where unit vector origins are located midway between the aiding nodes and the approximate position of the aided node, accuracy is significantly improved. Dependence on unit vectors also introduces ephemeris error as a contributor to GDOP.

GDOP is useful for identifying whether the FSN solution is an accurate position estimate. As a result, GDOP acts as a filter to determine when the dynamic tracking system needs to change the far sources used for a FSN solution. Under dynamic tracking, GDOP becomes extremely important since the aiding and aided nodes can move, along with some far sources. Because the geometries are constantly changing, the measurement of geometric error should be constantly updated.

The orthogonality and error magnitude metrics can be computed though use of similar matrix notation. For example, the measurement error e can be substituted into matrix notation as follows:

$$\begin{bmatrix} r_m - r \\ \delta \end{bmatrix} = (V^T V)^{-1} V^T \begin{bmatrix} e_1 \\ e_2 \\ e_3 \\ \vdots \\ e_N \end{bmatrix},$$

which yields a position error in $r_m$–r and thus in the position estimate of the aided node. The expected position error due to noise can then be computed using $M_{DOP}$ and added to the measurement error contribution.

Distortion Metric

The distortion metric quantifies the distortion in $M_{DOP}$ due to unit vector directional errors. Since any unit vector error produces some error in V, some positioning error will persist even in the absence of any noise. The distortion metric is therefore a lower order error than captured by other metrics, but is useful for indicating positioning accuracy. The distortion metric $M_d$ is expressed as follows:

$$M_d = \|A_d - A\| * \|(r - r_m)\|,$$

in which the expression is normalized by the magnitude of the distance between the aiding node and the aided node. This normalization is needed since any distortion is linearly magnified by the node-to-node distance. The distortion metric is an independent means of assessing the impact of the ephemeris errors on position error.

Example Applications of Metrics

For each of the following examples, assume that an approximate first order position of the aided node has been determined by any available means, and without use of metrics. Additionally, wherever the ephemeris error figures in to a calculation, assume that the dynamic tracking system has some available characterization of the error. For example, a 1 km maximum ephemeris error on a particular far source could mean a maximum error of +/–1 km. Further, the appropriate application of a metric involving ephemeris error is driven by the expectations on positioning error. For example, for GEO far sources, the metric thresholds can be more relaxed while LEO far sources, require metrics with tight thresholds. Metrics that address noise however should be applied universally over all cases.

One Aiding Nodes and One Far Source

Figure 12:
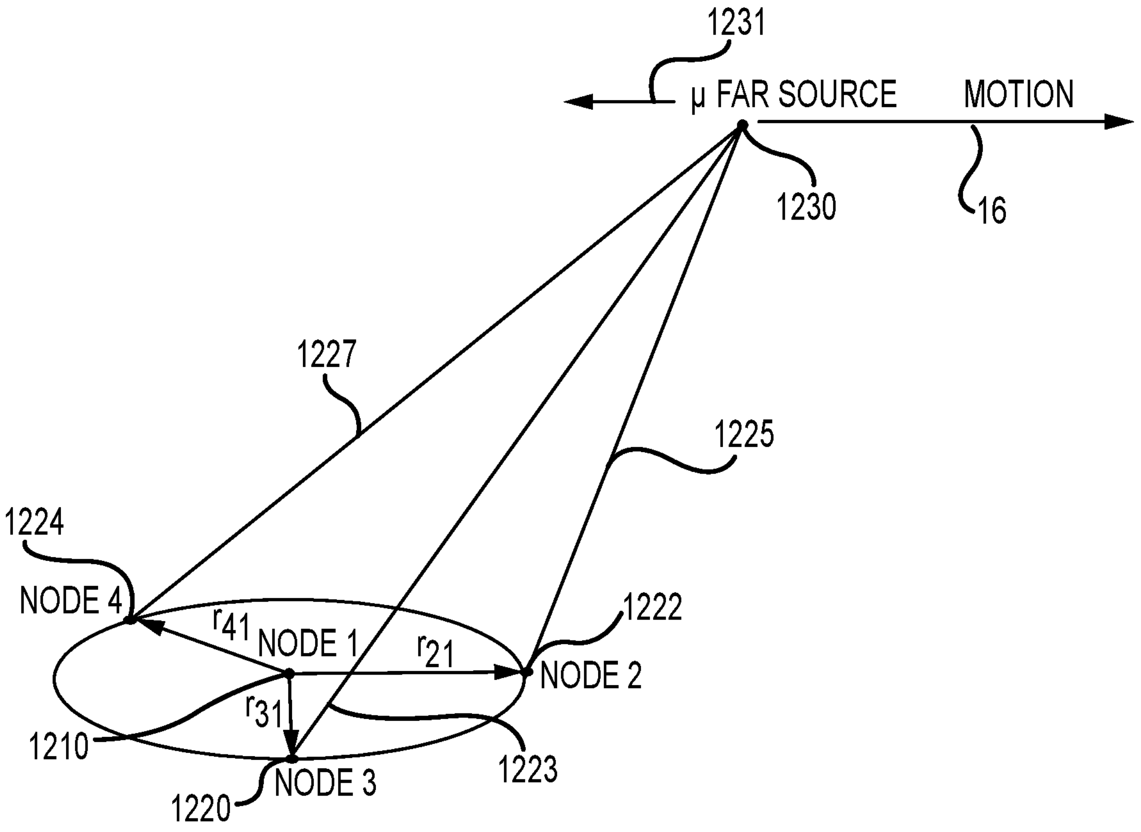
FIG. 12 presents a high-level diagram depicting use of selection metrics according to one embodiment of the present invention.

With reference to FIG. 12 is a diagram that illustrates the measurement error relationship between node geometry and a particular far source. Distances and directions in the diagram are not to scale. The aided node (Node 1) 1210 is situated relative to three aiding nodes, Node 3 1220, Node 2 1222, and Node 4 1224, each of which can assist Node 1 with a FSN measurement. The far source 1230 travels in the direction of the arrow 16, which vector should be visualized as a line parallel to $r_{21}$ but not directly overhead $r_{21}$. The predominant component of the ephemeris error vector is μ 1231 and is parallel to the direction of motion, wherein the magnitude and sign of the ephemeris error are unspecified. The aiding nodes have approximately the same unit vector 1223, 1225, 1227 direction to the far source, and for simplicity, all three nodes are assumed to have the same unit vector u. If $m_2$, $m_3$, and $m_3$ are the measurements corresponding to the three aiding nodes respectively, the orthogonality metric will be minimized if Node 3 is used. Where $r_{31}$ is perpendicular to the direction of motion of the far source, then $M_o$ is zero, no matter the size of μ. Node 2 will have the largest error, while Node 4 will have an intermediary error. Thus, if an FSN solution can use only a single aiding node, the preferred aiding node would have a geometry closest to that of Node 3, where $M_o$=0. Far source trajectories, if they are satellites, can be known well in advance. Consequently, with preparation and given knowledge of the far source and the ROI, aiding node selection may be used to reduce FSN measurement error.

One Aiding Node and Many Far Sources

Given the preferred selection of an orthogonal aiding node for the single far source scenario, it follows that when multiple far sources are available, the best approach to reduce error with one aiding node and many far sources available is first to select a far source whose direction of travel is closest to orthogonal to the vector connecting the aided node to the aiding node, i.e., select a far source that provides similar geometry to Node 3. A further selection criterion is to eliminate those far sources with elevations larger than a certain threshold. This is because far sources located directly overhead an ROI will have high measurement noise, and thus a low SNR.

The selection process for a single aiding node and many far sources would proceed as follows: First apply the orthogonality metric $M_0$ to each available far source to select a set of sources with the lowest orthogonality scores. Doing so will minimize the effect of ephemeris error; Next, apply the error magnitude metric $M_a$ to eliminate far sources with high measurement error scores. This step is most useful when the set of far sources has higher $M_0$ scores; Next, apply the $M_{DOP}$ metric to eliminate those of the remaining far sources having higher noise in the measurements. This will tend to eliminate far sources with poor geometry, such as those located directly overhead the aided node; Then, apply the distortion metric $M_a$ to the remaining far sources to find a good set of far sources for the aiding node. By running several iterations of the selection process, a good set of far sources is developed for each moment in time, allowing the dynamic tracking system to develop a full FSN positioning solution.

Many Aiding Nodes and One Far Source

In some scenarios, the FSN solution may be derived using multiple aiding nodes with a single far source. Assuming the far source is not near overhead the ROI, to develop the highest quality FSN solution those aiding nodes with a low orthogonality metric $M_o$ would be selected. For example, the dynamic tracking system may choose Node 3 1220 and Node 4 1224, but eliminate Node 2 1222. In such cases using multiple aiding nodes, the form of the matrices H, $H_{kf}$ and V from the FSN Equation are not identical to the case of a single aiding node, but can be derived similarly. For example, all aiding node measurements may be translated so that they appear to be generated at a single aiding node. This translation uses the known aiding positions combined with unit vectors defined from the mid-points of each aiding node to an estimated aided node position. Using such translations, the form of the FSN Equation is maintained. Use of multiple aiding nodes reduces measurement noise by providing more geometric diversity in the FSN measurements, but the improvement in geometry cannot replace the requirement for a minimum number of far sources to provide adequate geometry.

Many Aiding Nodes and Many Far Sources

For scenarios in which the dynamic tracking system has many available aiding nodes along with many available far sources, the system may simply employ the selection process outlined in Paragraph above. However, a more efficient approach is to use the orthogonality metric $M_o$ to pair each aiding node with a far source, and then use the best of the resulting pairs to produce a location estimate. For example, in a dynamic context in which both the aiding nodes and aided node are in motion, the dynamic tracking system applies the selection metrics to identify the best four pairings of aiding node to far source so that the pairs have low $M_o$, and/or low $M_a$, low $M_{DOP}$, and low $M_a$. The system may perform multiple iterations of the pairing process so that the best aiding node-far source pairs are used to generate the FSN solution at each moment in time.

Figure 13:
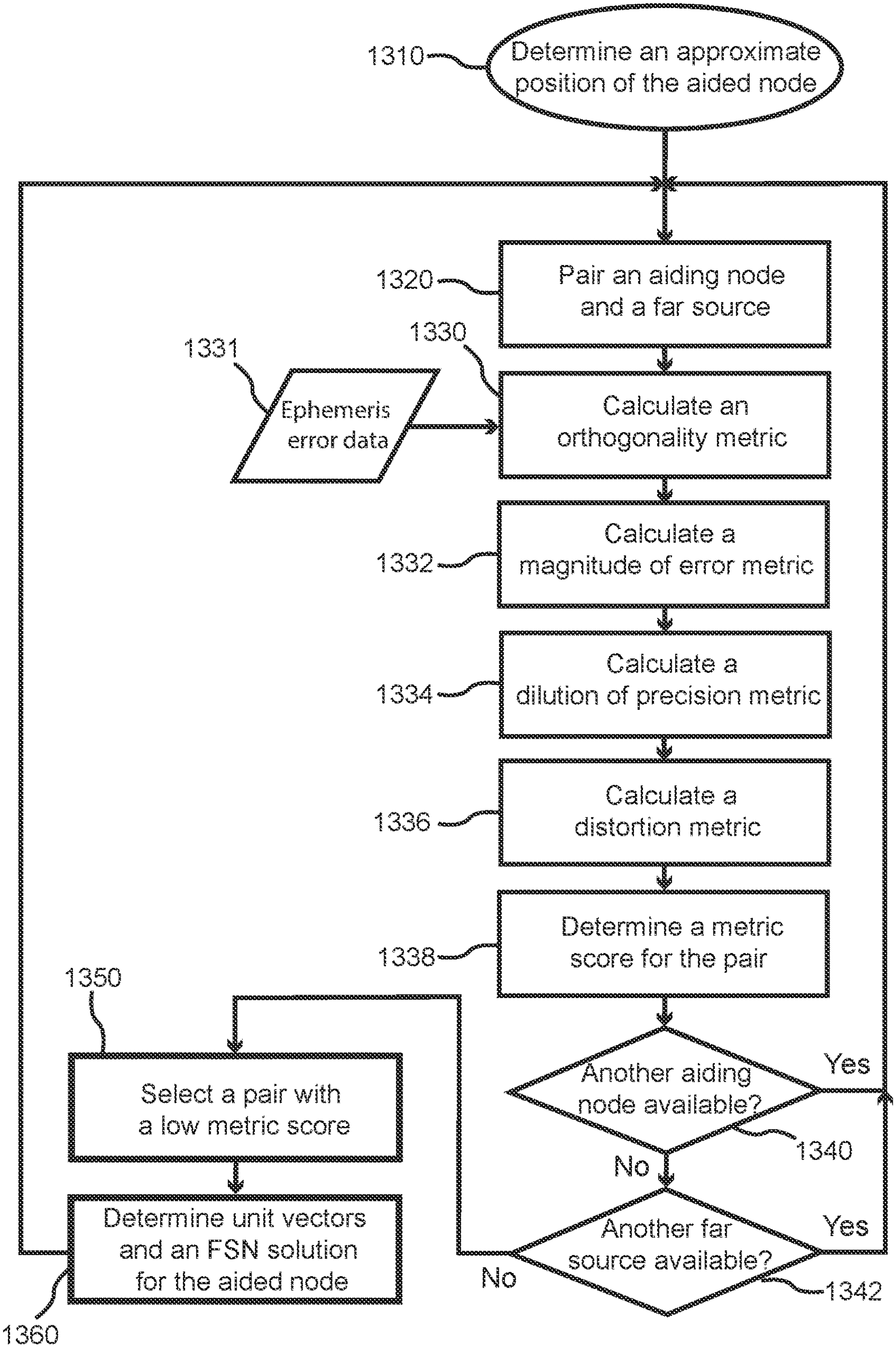
FIG. 13 depicts a flow chart showing an example process for using metrics to select aiding nodes and far sources as used in an embodiment of the present invention.

With reference to FIG. 13 is a flow chart showing an example process for using a set of metrics to select aiding nodes and far sources that will provide high quality FSN solutions for an aiding node in dynamic motion. If the aided node location is inexactly known, or reliant on a non-FSN solution, an approximate aided node location 1310 will be used. Based on the aided node approximate location, the dynamic tracking system will select an aiding node in the region of interest from among the available aiding nodes, and will pair the aiding node with a visible far source 1320. The far source will be selected from among those visible far sources that are, for example, within a window of suitable elevations.

Next, the tracking system will apply an orthogonality metric $M_0$ 1330 to the pair using ephemeris data 1331 for the selected far source and calculates an orthogonality score. Then the system applies an error magnitude metric $M_a$ 1332, and calculates an error magnitude score. Then the system applies a dilution of precision metric $M_{DOP}$ 1334, and calculates a dilution of precision score. Last, the system applies a distortion metric $M_d$ 1336 to the $M_{DOP}$, and calculates a distortion score. Once all of the metrics are calculated, the system assigns a metric score 1338 to the aiding node-far source pair, which is a measure of their ability to contribute to a quality FSN for the aided node at a point in time. The system then queries whether another aiding node is available for evaluation 1340. If one is available, the system will apply the metrics to the new aiding node with the far source. If no additional aiding nodes are available, the system will query whether another far source is available for evaluation 1342. If one is available, the system will apply the metrics to the aiding node with the new far source. In this way, the tracking system will index through all available aiding node-far source combinations and assign a metric score to each one. Other indexing sequences are possible and contemplated, including parallel evaluation of aiding node-far source pairs. Once all available aiding node-far source pairs are scored, the tracking system will select a pair that provides a quality FSN solution 1350, and will determine an FSN solution for the aided node 1360. Multiple aiding node-far source pairs may be used to develop the same FSN solution, which may improve the overall quality of the solution in a given circumstance. The tracking system then starts the metric evaluation process again 1320 to select an aiding node-far source pair for the next FSN solution.

In some embodiments, the system may halt metric evaluation for an aiding node-far source pair if the orthogonality score or error magnitude score is over a set threshold, and select a different pair. However, such thresholds are flexible. For example, the system may evaluate all available aiding node-far source pairs using the full set of metrics, and find none of them satisfy a metric threshold, or the set of identified pairs are insufficient to develop a full 4 DOF solution. In such cases, the system would relax its standards so that at least one aiding node and four far sources are identified, even if the pairs are not ideal.

Figure 14:
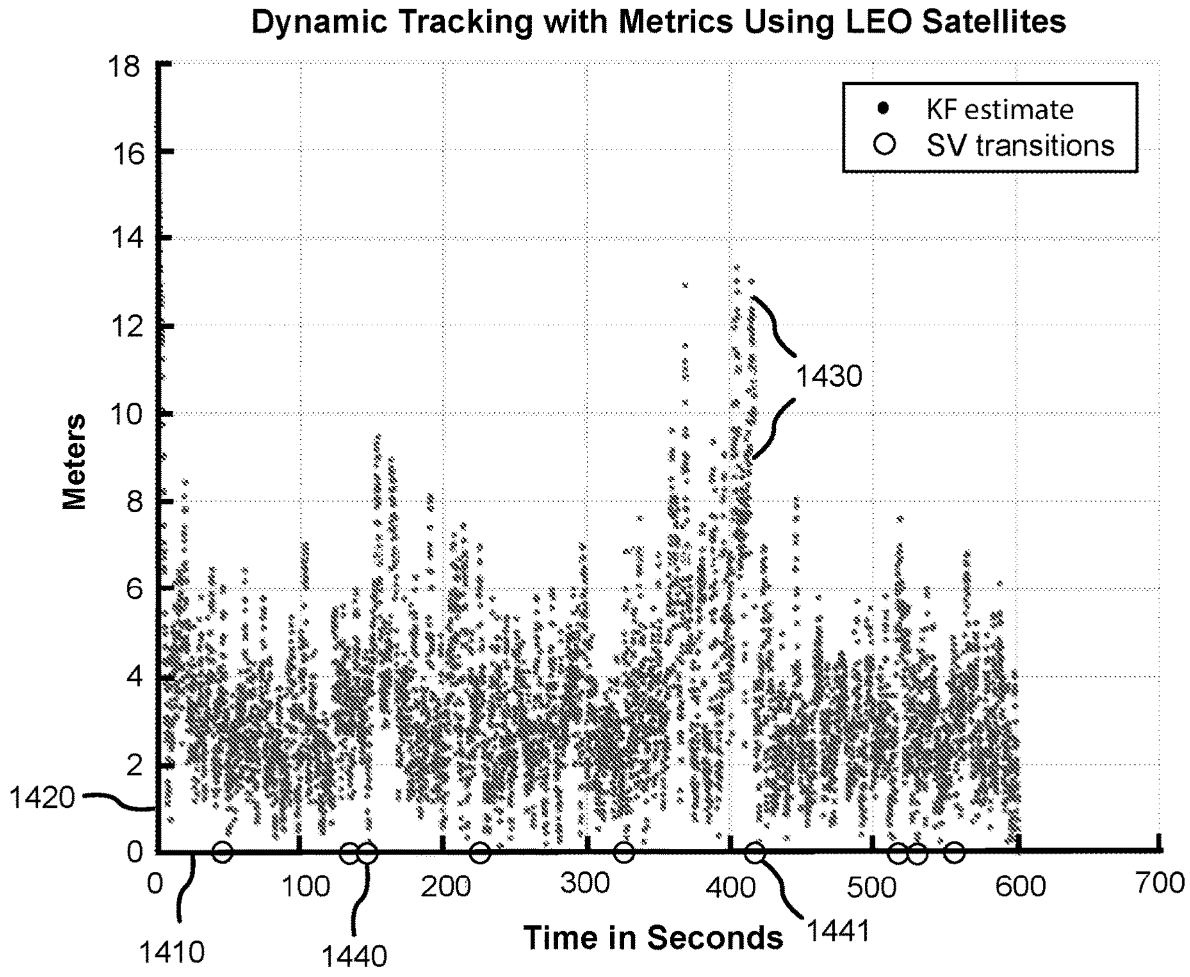
FIG. 14 presents the results of a simulation of the FSN technique of the present invention showing the accuracy of the method.

The disclosed dynamic tracking system with metric-facilitated selection of far sources and aiding nodes is highly effective as a means of positioning while an aided node is in motion. With reference to FIG. 14 is depicted a sample plot showing a simulation of the dynamic tracking system determining a FSN solution using LEO satellites, as corrected by a Kalman Filter. On the x-axis 1410 is shown elapsed time in seconds, and the y-axis 1420 shows position error in meters. Visible on the plot are data points 1430 representing the error for KF position estimates for an aided node at a moment in time. On the x-axis are visible data points 1440 showing times at which the system switched to a different far source based on metric evaluation of far source quality. The simulation was conducted under certain set parameters, including an ephemeris error value of 1 km, measurement noise bounds of 3 to 6 meters, 6 satellites available, and the distance between aiding node and aided node bounded at 4 to 12 km. The results show a median positioning error of 3.1 meters, and a median error in 2-D of 2.1 meters. Such results are competitive with traditional GPS positioning errors. Also apparent is a dramatic reduction in positioning error after the system switched far sources, e.g., 1441, demonstrating the effectiveness of the disclosed metric-based selection process.

Figure 15:
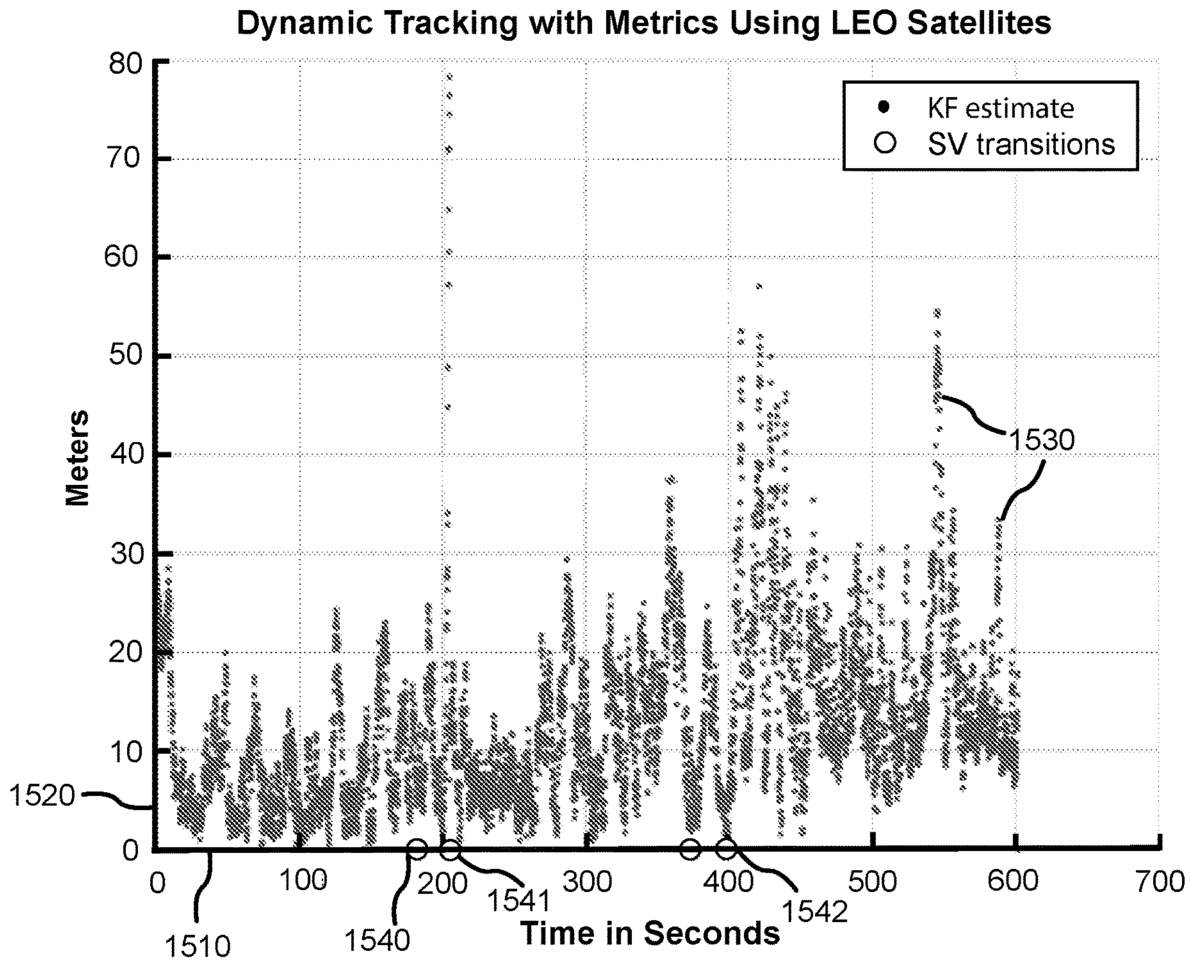
FIG. 15 presents the results of a simulation of the FSN technique of the present invention showing the accuracy of the method.

With reference to FIG. 15 is depicted another sample plot showing a simulation of the dynamic tracking system determining a FSN solution using LEO satellites, as corrected by a Kalman Filter. Like features of the plot are labeled with like labels as for FIG. 14. This simulation was conducted under parameters including an ephemeris error value of 1 km, measurement noise bounds of 3 to 6 meters, 6 satellites available, and the distance between aiding node and aided node bounded at 27 to 33 km. The results show a median positioning error of 10.6 and a median error in 2-D of 4.7 meters. These results show the negative effect of choosing aiding nodes that are distant to the aided node. Again, the dramatic reduction in positioning error is shown following a change in far sources, e.g., 1541, 1542.

Out of Track Ephemeris Error

While the examples discussed herein address the predominant case in which ephemeris error aligns with the satellite's in-track (along-track) direction, FSN selection criteria may be adapted to assess the value of a far source with dominant ephemeris error in any specified direction. In such cases, $M_0$ would include an ephemeris error vector $\mu$ pointing in a direction different from the in-track direction. The orthogonality metric and other metrics may be applied to such cases in a similar way to the in-track case. Note that the error magnitude metric $M_a$ and the dilution of precision metric $M_{DOP}$ include only the magnitude of ephemeris error, and are therefore agnostic to the ephemeris error dominant direction.

As will be understood by those familiar with the art, the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

While there have been described above the principles of the present invention in conjunction with a positional determination using far sources, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A method for position determination, the method comprising defining a region of interest (ROI) that contains an aiding node and an aided node, wherein the aiding node has a known location, and wherein the aided node receives communications from the aiding node;

identifying a source that broadcasts a signal receivable by the aiding node and the aided node;

determining an approximate location of the aided node;

determining a first unit vector from the approximate location of the aided node to the source;

determining an aiding node time of arrival (TOA) for the signal, and an aided node TOA for the signal;

calculating a time difference between the aiding node TOA and the aided node TOA;

determining, using the time difference, a directional distance from the aiding node to the aided node; and determining a first aided node location and an aided node clock delay using the directional distance.

2. The method for position determination of claim 1, further comprising:

determining a second unit vector from a midpoint to the source, wherein the midpoint is equidistant between the aiding node and the aided node; and determining a refined aided node location and a refined aided node clock delay using the second unit vector.

3. The method for position determination of claim 1, wherein the first unit vector is determined as follows: approximating a time of flight from the aiding node to the source using a location of the aiding node and an ephemeris error for the source.

4. The method for position determination of claim 1, wherein the ROI includes a plurality of aiding nodes, and further comprising:

approximating a time of flight from each of the plurality of aiding nodes to the source using a location for each of the plurality of aiding nodes and an ephemeris error for the source;

determining an array of unit vectors from each of the plurality of aiding nodes to the source; and determining a refined aided node location and a refined aided node clock delay using the array of unit vectors.

5. A method for dynamic position determination, comprising:

identifying one or more aiding nodes within a region of interest (ROI);

determining a set of visible sources that transmit signals that are receivable within the ROI;

down selecting the set of visible sources to create a set of useable sources that includes only sources with an elevation that is within a range of elevations;

applying one or more metrics to the one or more aiding nodes and the set of useable sources to create a set of selected sources; and determining a location for an aided node using a source navigation algorithm and the set of selected sources.

6. The method for dynamic position determination of claim 5, wherein the one or more metrics includes an orthogonality metric for assessing the orthogonality of a first vector from an aiding node to the aided node compared with a second vector in the direction of a dominant ephemeris error for a source, and wherein the orthogonality metric has a value of zero when the first vector is orthogonal to the second vector.

7. The method for dynamic position determination of claim 5, wherein the one or more metrics includes an error magnitude metric for assessing the ratio of the magnitude of an ephemeris error for a source to the magnitude of a true ephemeris of the source minus a distance from the ROI to the source.

8. The method for dynamic position determination of claim 7, wherein the error magnitude metric is used to set an upper bound for error from the source.

9. The method for dynamic position determination of claim 5, wherein the one or more metrics includes a dilution of precision metric for assessing the measurement noise in a source navigation solution.

10. The method for dynamic position determination of claim 5, wherein the one or more metrics includes a distortion metric for assessing the distortion to a dilution of precision metric caused by an error in a unit vector direction.

11. The method for dynamic position determination of claim 5, wherein the one or more metrics includes a preponderance of error metric that is the mathematical product of an orthogonality metric and an error magnitude metric.

12. The method for dynamic position determination of claim 5, the applying step further comprising:

applying one or more metrics to the one or more aiding nodes and the set of selected sources to identify a selected aiding node.

13. The method for dynamic position determination of claim 5, the applying step further comprising:

applying one or more metrics to the one or more aiding nodes and the set of selected sources to pair an aiding node with a source.

14. The method for dynamic position determination of claim 5, the applying step further comprising:

applying an orthogonality metric to an aiding node and the set of selected sources to identify a first subset of selected sources with a low orthogonality score;

applying an error magnitude metric to the aiding node and the first subset of selected sources to identify a second subset of selected sources with a measurement error;

applying a dilution of precision metric to the aiding node and the second subset of selected sources to identify a third subset of selected sources with a measurement noise value;

applying a distortion metric to the aiding node and the third subset of selected sources to identify a fourth subset of selected sources with a low distortion value; and determining a location for an aided node using a source navigation algorithm and the fourth set of selected sources.

* * * * *